United States Patent
Park et al.

(10) Patent No.: US 12,487,434 B2
(45) Date of Patent: Dec. 2, 2025

(54) OPTICAL IMAGING SYSTEM INCLUDING EIGHT LENSES OF ++-+---+-, ++-+-++-, ++---++ - OR ++---++- REFRACTIVE POWERS

(71) Applicant: SAMSUNG ELECTRO-MECHANICS CO., LTD., Suwon-si (KR)

(72) Inventors: Il Yong Park, Suwon-si (KR); In Do Seo, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 1001 days.

(21) Appl. No.: 17/177,476

(22) Filed: Feb. 17, 2021

(65) Prior Publication Data

US 2022/0099943 A1 Mar. 31, 2022

(30) Foreign Application Priority Data

Sep. 29, 2020 (KR) .................. 10-2020-0127218

(51) Int. Cl.
*G02B 13/00* (2006.01)
*G02B 9/64* (2006.01)
*G02B 13/18* (2006.01)

(52) U.S. Cl.
CPC .......... *G02B 13/0045* (2013.01); *G02B 9/64* (2013.01); *G02B 13/18* (2013.01)

(58) Field of Classification Search
CPC ....... G02B 13/0045; G02B 9/64; G02B 13/18
See application file for complete search history.

(56) References Cited

U.S. PATENT DOCUMENTS

| | | |
|---|---|---|
| 9,523,841 B1 | 12/2016 | Chen |
| 11,409,082 B2 | 8/2022 | Nitta et al. |
| 2005/0057795 A1 | 3/2005 | Tada et al. |
| 2010/0182677 A1 | 7/2010 | Wang et al. |
| 2017/0052350 A1 | 2/2017 | Chen |
| 2017/0329108 A1 | 11/2017 | Hashimoto |
| 2018/0348491 A1 | 12/2018 | Lee |
| 2019/0056568 A1 | 2/2019 | Huang |

(Continued)

FOREIGN PATENT DOCUMENTS

| | | |
|---|---|---|
| CN | 108681040 A | 10/2018 |
| CN | 110515187 A | 11/2019 |

(Continued)

OTHER PUBLICATIONS

CN-111624738-A, translation (Year: 2020).*

(Continued)

*Primary Examiner* — Wen Huang
(74) *Attorney, Agent, or Firm* — NSIP Law

(57) ABSTRACT

An optical imaging system includes a first lens, a second lens, a third lens, a fourth lens, a fifth lens, a sixth lens, a seventh lens and an eighth lens disposed sequentially from an object side The first lens and the second lens each have a positive refractive power, and the third lens has a negative refractive power, and D12/D_MAX<0.15 is satisfied, where D12 is a distance on an optical axis between an image-side surface of the first lens and an object-side surface of the second lens, and D_MAX is a greatest distance among distances between neighboring lenses.

12 Claims, 10 Drawing Sheets

(56) References Cited

U.S. PATENT DOCUMENTS

| | | |
|---|---|---|
| 2019/0121098 A1 | 4/2019 | Zhou et al. |
| 2019/0204558 A1 | 7/2019 | Jhang et al. |
| 2019/0278063 A1 | 9/2019 | Sekine |
| 2019/0310448 A1 | 10/2019 | Hashimoto |
| 2020/0026040 A1 | 1/2020 | Teraoka |
| 2020/0132969 A1 | 4/2020 | Huang |
| 2020/0174227 A1 | 6/2020 | Nitta |
| 2020/0201002 A1 | 6/2020 | Xu et al. |
| 2020/0363610 A1 | 11/2020 | Ko et al. |
| 2020/0393648 A1 | 12/2020 | Lin et al. |
| 2021/0018728 A1 | 1/2021 | Li et al. |
| 2021/0096329 A1 | 4/2021 | Lv et al. |
| 2021/0109323 A1 | 4/2021 | Dai et al. |
| 2021/0132336 A1 | 5/2021 | Chen et al. |
| 2021/0302696 A1 | 9/2021 | Nitta et al. |
| 2021/0382281 A1* | 12/2021 | Huang ............... G02B 27/0012 |
| 2022/0075152 A1* | 3/2022 | Li ....................... G02B 13/0045 |

FOREIGN PATENT DOCUMENTS

| | | | |
|---|---|---|---|
| CN | 110531503 A | | 12/2019 |
| CN | 110632742 A | | 12/2019 |
| CN | 111308649 A | | 6/2020 |
| CN | 111522124 A | | 8/2020 |
| CN | 111624738 A | * 9/2020 | ......... G02B 13/0045 |
| CN | 211577542 U | | 9/2020 |
| JP | 2017-116594 A | | 6/2017 |
| JP | 6530538 B1 | | 6/2019 |
| JP | 6754541 B1 | | 9/2020 |
| TW | 1410673 B | | 10/2013 |
| TW | 201706659 A | | 2/2017 |
| TW | 201839453 A | | 11/2018 |
| TW | 201913165 A | | 4/2019 |
| TW | 201930951 A | | 8/2019 |
| TW | 1694268 B | | 5/2020 |
| TW | 202016600 A | | 5/2020 |

OTHER PUBLICATIONS

Taiwanese Office Action dated Aug. 30, 2021 issued in counterpart Taiwanese Patent Application No. 110106583 (8 pages in English and 8 pages in Taiwanese).

Chinese Office Action issued on Sep. 30, 2022, in counterpart Chinese Patent Application No. 202110718652.9 (7 pages in English and 9 pages in Chinese).

Korean Office Action issued on Jun. 2, 2023, in counterpart Korean Patent Application No. 10-2022-0137949 (6 pages in English, 5 pages in Korean).

Korean Office Action issued on Jan. 21, 2022, in counterpart Korean Patent Application No. 10-2020-0127218 (8 pages in English and 6 pages in Korean).

Taiwanese Office Action issued on Jun. 9, 2023, in counterpart Taiwanese Patent Application No. 111120630 (5 pages in English, 5 pages in Chinese).

Taiwanese Office Action issued on Oct. 12, 2022, in counterpart Taiwanese Patent Application No. 111120630 (6 Pages in Chinese, 7 Pages in English).

Taiwanese Office Action issued on May 8, 2024, in counterpart Taiwanese Patent Application No. 113104857 (4 pages in English, 5 pages in Chinese).

Chinese Office Action issued on May 21, 2025, in corresponding Chinese Patent Application No. 202310537840.0. (4pages in English, 7pages in Chinese).

Taiwanese Office Action issued on May 16, 2025, in corresponding Taiwanese Patent Application No. 114110013. (7pages in English, 6pages in Taiwanese).

* cited by examiner

OPTICAL IMAGING SYSTEM INCLUDING EIGHT LENSES OF ++-+--+-, ++-+-++-, ++---++ - OR ++---++- REFRACTIVE POWERS

CROSS-REFERENCE TO RELATED APPLICATIONS

This application claims the benefit under 35 USC 119(a) of Korean Patent Application No. 10-2020-0127218 filed on Sep. 29, 2020 in the Korean Intellectual Property Office, the entire disclosure of which is incorporated herein by reference for all purposes.

BACKGROUND

1. Field

The following description relates to an optical imaging system.

2. Description of Related Art

Portable terminals have been equipped with a camera including an optical imaging system comprised of a plurality of lenses to enable video calls and photography.

In addition, as functions occupied by cameras in portable terminals are gradually increasing, demand for a camera for portable terminals having high resolution is increasing.

Further, since portable terminals are gradually becoming smaller, slimmer cameras for portable terminals are also required.

Therefore, there is a need to develop an optical imaging system that is slim and capable of implementing high resolution.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

Examples provide a slim optical imaging system in which high resolution may be implemented.

In one general aspect, an optical imaging system includes a first lens, a second lens, a third lens, a fourth lens, a fifth lens, a sixth lens, a seventh lens and an eighth lens disposed sequentially from an object side The first lens and the second lens each have a positive refractive power, and the third lens has a negative refractive power, and D12/D_MAX<0.15 is satisfied, where D12 is a distance on an optical axis between an image-side surface of the first lens and an object-side surface of the second lens, and D_MAX is a greatest distance among distances between neighboring lenses.

The optical imaging system may satisfy (D12+D23)/D_SUM<0.1, where D23 is a distance on the optical axis between an image-side surface of the second lens and an object-side surface of the third lens, and D_SUM is a sum of the distances between each pair of the neighboring lenses.

The optical imaging system may satisfy 0.9<R2/R3<1.1, where R2 is a radius of curvature of the image-side surface of the first lens, and R3 is a radius of curvature of the object-side surface of the second lens.

The optical imaging system may satisfy the first lens has a meniscus shape convex toward the object side, and the second lens has a meniscus shape convex toward the object side.

The optical imaging system may satisfy D12/f<0.1, where f is a total focal length of the optical imaging system.

The optical imaging system may satisfy D67−D12−D23>0.2, where D23 is a distance on the optical axis between an image-side surface of the second lens and an object-side surface of the third lens, and D67 is a distance on the optical axis between an image-side surface of the sixth lens and an object-side surface of the seventh lens.

The optical imaging system may satisfy TTL/(2*IMG HT)<0.8, where TTL is a distance on the optical axis from an object-side surface of the first lens to an image plane, and IMG HT is one-half of a diagonal length of the image plane.

The optical imaging system may satisfy TTL/f<1.2 and BFL/f<0.3, where f is a total focal length of the optical imaging system, and BFL is a distance on the optical axis from an image-side surface of the eighth lens to the image plane.

The optical imaging system may satisfy at least one of 25<v1−v3<45, 25<v1−v5<45 and 15<v1−v6<25 is satisfied, where v1 is an Abbe number of the first lens, v3 is an Abbe number of the third lens, v5 is an Abbe number of the fifth lens, and v6 is an Abbe number of the sixth lens.

The fifth lens may have a negative refractive power, the sixth lens may have a positive or negative refractive power, and the third lens, the fifth lens, and the sixth lens may each have a refractive index of 1.57 or more.

The third lens and the fifth lens may each have a refractive index greater than 1.64.

The optical imaging system may satisfy |f1/f2|<1, where f1 is a focal length of the first lens, and f2 is a focal length of the second lens.

The optical imaging system may satisfy 0<f1/f<1.4, where f is a total focal length of the optical imaging system.

The optical imaging system may satisfy 5<f2/f<50.

The fourth lens may have a positive or negative refractive power, the fifth lens may have a negative refractive power, the sixth lens may have a positive or negative refractive power, the seventh lens may have a positive refractive power, and the eighth lens may have a negative refractive power.

In one general aspect, an optical imaging system includes a first lens, a second lens, a third lens, a fourth lens, a fifth lens, a sixth lens, a seventh lens and an eighth lens disposed sequentially from an object side. A sign of refractive power of the first lens and the second lens is different from a sign of refractive power of the third lens, at least three lenses among the third lens to the eighth lens each have a refractive index of 1.57 or more, and (D12+D23)/D_SUM<0.1 is satisfied, where D12 is a distance on an optical axis between an image-side surface of the first lens and an object-side surface of the second lens, D23 is a distance on the optical axis between an image-side surface of the second lens and an object-side surface of the third lens, and D_SUM is a sum of distances between each pair of neighboring lenses.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

Figure 1:
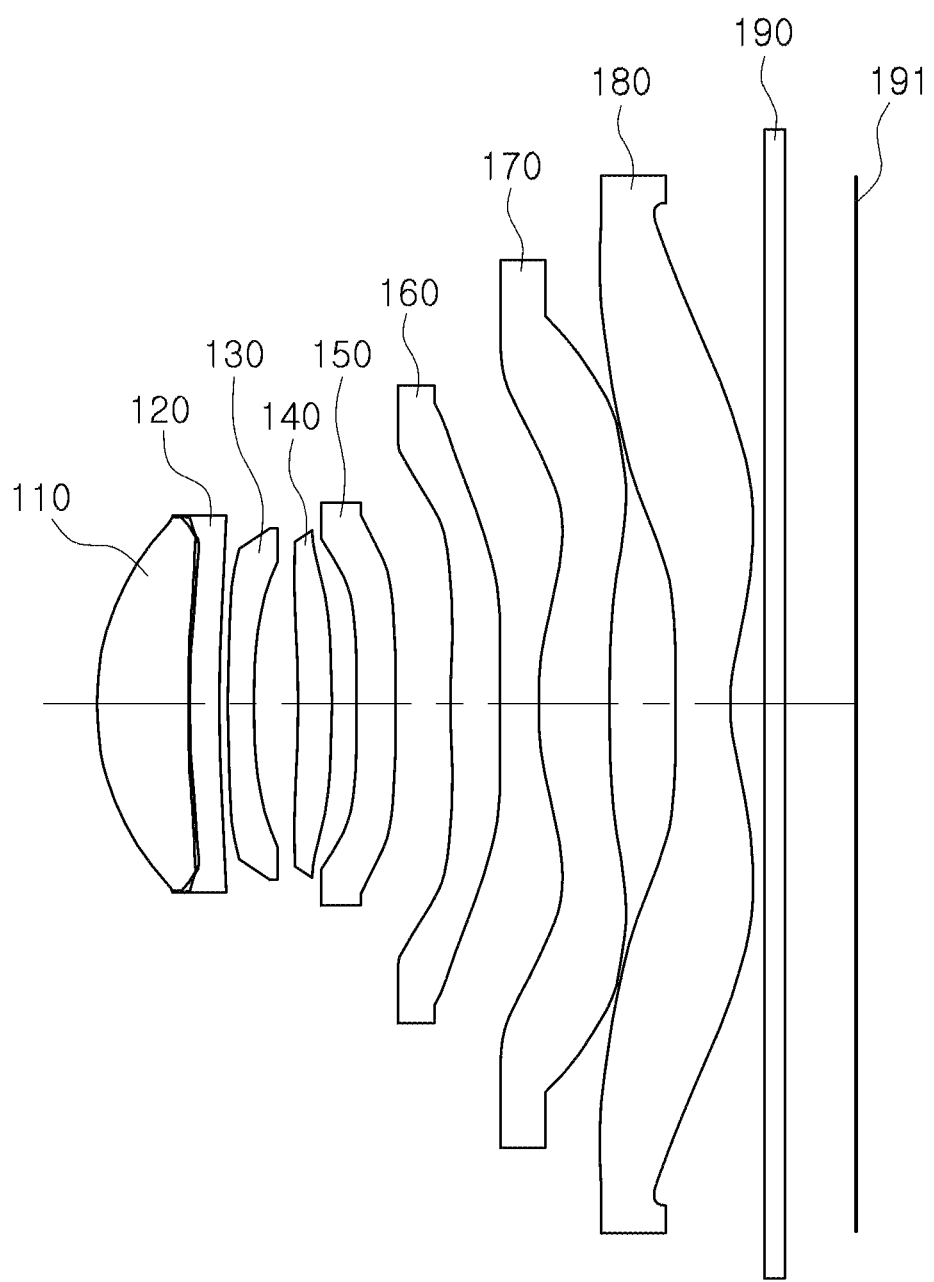
FIG. 1 is a configuration diagram of an optical imaging system according to a first example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

In the following configuration diagrams of lenses, the thickness, size, and shape of the lens are somewhat exaggerated for descriptions, and in detail, the shape of the spherical or aspherical surface suggested in the lens configuration diagram is presented as an example, but is not limited thereto.

An optical imaging system according to an example includes at least 8 lenses.

A first lens may indicate a lens closest to an object side, and the last lens may indicate a lens closest to an image sensor.

In addition, in each lens, a first surface (or an object-side surface) refers to a surface close to the object side, and a second surface (or an image-side surface) refers to a surface close to the image side. In addition, in the present specification, values for the radius of curvature, thickness, distance, and focal length of the lens are all in mm, and the unit of field of view (FOV) is degree.

In addition, in the description of the shape of each lens, the meaning of a convex shape on one surface means that a paraxial region portion of the surface is convex, and the meaning of a concave shape on one surface means that a paraxial region portion of the surface is concave. The meaning that one surface is flat means that a paraxial region portion of the surface is a plane.

Therefore, even in the case in which it is described that one surface of the lens is convex, the edge portion of the lens may be concave. Similarly, even in the case in which it is described that one surface of the lens is concave, the edge portion of the lens may be convex. Further, even in the case in which one surface of the lens is described as a flat surface, the edge portion of the lens may be convex or concave.

On the other hand, the paraxial region refers to a very narrow region near an optical axis.

The optical imaging system according to an example includes at least 8 lenses.

For example, the optical imaging system according to an example includes a first lens, a second lens, a third lens, a fourth lens, a fifth lens, a sixth lens, a seventh lens and an eighth lens. The first to eighth lenses are spaced apart from each other by a predetermined distance along the optical axis.

The optical imaging system according to an example may include 9 or more lenses as necessary.

The optical imaging system according to an example may further include an image sensor for converting an incident image of a subject into an electric signal.

In addition, the optical imaging system may further include an infrared filter (hereinafter, referred to as "filter") for blocking infrared rays. The filter is disposed between the last lens and the image sensor.

In addition, the optical imaging system may further include a stop for adjusting the amount of light.

Lenses constituting the optical imaging system according to an example may be formed of a plastic material.

In addition, all lenses have an aspherical surface. For example, each of the first to eighth lenses may have at least one aspherical surface.

For example, at least one of first and second surfaces of the first to eighth lenses may be aspherical. In this case, the aspherical surfaces of the first to eighth lenses are expressed by Equation 1.

$$Z = \frac{cY^2}{1+\sqrt{1-(1+K)c^2Y^2}} + AY^4 + BY^6 + CY^8 + DY^{10} + EY^{12} + FY^{14} + GY^{16} + HY^{18} + JY^{20} + LY^{22} + MY^{24} + NY^{26} + OY^{28} + PY^{30} \ldots$$ [Equation 1]

In Equation 1, c is the curvature of the lens (a reciprocal of the radius of curvature), K is the conic constant, and Y is the distance from an arbitrary point on the aspherical surface of the lens to the optical axis. In addition, constants A to P denote aspheric coefficients, and Z represents the distance from an arbitrary point on the aspherical surface of the lens to the vertex of the aspherical surface.

The optical imaging system including the first to eighth lenses may have positive/positive/negative/positive/negative/negative/positive/negative refractive power in order from the object side, or may have positive/positive/negative/positive/negative/positive/positive/negative refractive power, or may have positive/positive/negative/negative/negative/positive/positive/negative refractive power.

The optical imaging system according to an example may satisfy at least one of the following conditional expressions.

| | |
|---|---|
| $0 < f1/f < 1.4$ | [Conditional Expression 1] |
| $25 < v1-v3 < 45$ | [Conditional Expression 2] |
| $25 < v1-v5 < 45$ | [Conditional Expression 3] |
| $15 < v1-v6 < 25$ | [Conditional Expression 4] |
| $5 < f2/f < 50$ | [Conditional Expression 5] |
| $-5 < f3/f < 0$ | [Conditional Expression 6] |
| $|f4/f| > 3$ | [Conditional Expression 7] |
| $-25 < f5/f < 0$ | [Conditional Expression 8] |
| $f6/f > 2$ | [Conditional Expression 9] |
| $f7/f < 5$ | [Conditional Expression 10] |
| $TTL/f < 1.2$ | [Conditional Expression 11] |
| $|f1/f2| < 1$ | [Conditional Expression 12] |
| $-2 < f1/f3 < 0$ | [Conditional Expression 13] |
| $BFL/f < 0.3$ | [Conditional Expression 14] |
| $D12/f < 0.1$ | [Conditional Expression 15] |
| $D67-D12-D23 > 0.2$ | [Conditional Expression 16] |
| $TTL/(2*IMG\ HT) < 0.8$ | [Conditional Expression 17] |
| $D12/D\_MAX < 0.15$ | [Conditional Expression 18] |
| $(D12+D23)/D\_SUM < 0.1$ | [Conditional Expression 19] |
| $0.9 < R2/R3 < 1.1$ | [Conditional Expression 20] |
| $70° < FOV < 92°$ | [Conditional Expression 21] |
| $1.5 < Fno < 2$ | [Conditional Expression 22] |

In the conditional expressions 1 to 22, f is the total focal length of the optical imaging system, f1 is the focal length of the first lens, f2 is the focal length of the second lens, f3 is the focal length of the third lens, f4 is the focal length of the fourth lens, f5 is the focal length of the fifth lens, f6 is the focal length of the sixth lens, and f7 is the focal length of the seventh lens.

v1 is the Abbe number of the first lens, v3 is the Abbe number of the third lens, and v5 is the Abbe number of the fifth lens.

TTL is the distance on the optical axis from the object-side surface of the lens (e.g., the first lens) disposed closest to the object side to the image plane of the image sensor, and BFL is the distance on the optical axis from the image-side surface of the lens (e.g., the eighth lens) disposed closest to the image sensor to the image plane of the image sensor.

D12 is the distance on the optical axis between the image-side surface of the first lens and the object-side surface of the second lens, D23 is the distance on the optical axis between the image-side surface of the second lens and the object-side surface of the third lens, and D67 is the distance on the optical axis between the image-side surface of the sixth lens and the object-side surface of the seventh lens.

D_MAX is a greatest distance among distances between neighboring lenses, D_SUM is the sum of distances between neighboring lenses, R2 is the radius of curvature of the image-side surface of the first lens, and R3 is the radius of curvature of the object-side surface of the second lens.

IMG HT is one-half of the diagonal length of the image plane of the image sensor, FOV is the angle of view of the optical imaging system, and Fno is the F-number of the optical imaging system.

The optical imaging system according to an example includes first to eighth lenses.

The first lens has positive refractive power. In addition, the first lens may have a meniscus shape convex toward the object. In detail, the first surface of the first lens may be convex, and the second surface of the first lens may be concave.

At least one of the first and second surfaces of the first lens may be aspherical. For example, both surfaces of the first lens may be aspherical.

The second lens has positive refractive power. In addition, the second lens may have a meniscus shape convex toward the object. In detail, the first surface of the second lens may be convex, and the second surface of the second lens may have a concave shape.

At least one of the first and second surfaces of the second lens may be an aspherical surface. For example, both surfaces of the second lens may be aspherical.

The third lens has negative refractive power. In addition, the third lens may have a meniscus shape convex toward the object. In detail, the first surface of the third lens may be convex, and the second surface of the third lens may have a concave shape.

At least one of the first and second surfaces of the third lens may be aspherical. For example, both surfaces of the third lens may be aspherical.

The fourth lens has positive or negative refractive power. In addition, the fourth lens may have a meniscus shape convex toward the image side. In detail, the first surface of the fourth lens may be concave, and the second surface of the fourth lens may be convex.

At least one of the first and second surfaces of the fourth lens may be an aspherical surface. For example, both surfaces of the fourth lens may be aspherical.

The fifth lens has negative refractive power. In addition, the fifth lens may have a meniscus shape convex toward the object. In detail, the first surface of the fifth lens may be convex in a paraxial region, and the second surface of the fifth lens may be concave in the paraxial region.

At least one of the first and second surfaces of the fifth lens may be an aspherical surface. For example, both surfaces of the fifth lens may be aspherical.

At least one inflection point may be formed on at least one of the first and second surfaces of the fifth lens. For example, the first surface of the fifth lens may be convex in the paraxial region and may be concave in a portion other than the paraxial region. The second surface of the fifth lens may be concave in the paraxial region and may be convex in a portion other than the paraxial region.

The sixth lens has positive or negative refractive power. In addition, the sixth lens may have a meniscus shape convex toward the object. In detail, the first surface of the sixth lens may be convex in the paraxial region, and the second surface of the sixth lens may be concave in the paraxial region.

At least one of the first and second surfaces of the sixth lens may be an aspherical surface. For example, both surfaces of the sixth lens may be aspherical.

At least one inflection point may be formed on at least one of the first and second surfaces of the sixth lens. For example, the first surface of the sixth lens may be convex in a paraxial region and concave in a portion other than the paraxial region. The second surface of the sixth lens may be concave in the paraxial region and convex in a portion other than the paraxial region.

The seventh lens has positive refractive power. In addition, the seventh lens may have a meniscus shape convex toward the object. In detail, the first surface of the seventh lens may be convex in the paraxial region, and the second surface of the seventh lens may be concave in the paraxial region.

At least one of the first and second surfaces of the seventh lens may be an aspherical surface. For example, both surfaces of the seventh lens may be aspherical.

In addition, at least one inflection point may be formed on at least one of the first and second surfaces of the seventh lens. For example, the first surface of the seventh lens may be convex in a paraxial region and concave in a portion other than the paraxial region. The second surface of the seventh lens may be concave in the paraxial region and convex in a portion other than the paraxial region.

The eighth lens has negative refractive power. In addition, the eighth lens may have a meniscus shape convex toward the object. In detail, the first surface of the eighth lens may be convex in the paraxial region, and the second surface of the eighth lens may be concave in the paraxial region.

At least one of the first and second surfaces of the eighth lens may be an aspherical surface. For example, both surfaces of the eighth lens may be aspherical.

In addition, at least one inflection point may be formed on at least one of the first and second surfaces of the eighth lens. For example, the first surface of the eighth lens may be convex in the paraxial region and concave in a portion other than the paraxial region. The second surface of the eighth lens may be concave in the paraxial region and convex in a portion other than the paraxial region.

The first lens and the second lens may be formed of a plastic material having the same optical properties, and the second lens and the third lens may be formed of a plastic material having different optical properties.

A distance between the first lens and the second lens and a distance between the second lens and the third lens may be configured to be relatively narrow. For example, among the distances between adjacent lenses, the distance between the first lens and the second lens or the distance between the second lens and the third lens may be the narrowest.

For example, the distance between the first lens and the second lens may be less than 15% of a greatest distance among the distances between adjacent lenses.

For example, the sum of the distance between the first lens and the second lens and the distance between the second lens and the third lens may be less than 10% of the sum of the distances between adjacent lenses.

The first lens and the second lens may have the same sign of refractive power. For example, both the first lens and the second lens may have positive refractive power.

The sign of the refractive power of the first lens and the second lens may be different from the sign of the refractive power of the third lens. For example, both the first lens and the second lens may have positive refractive power, and the third lens may have negative refractive power.

The image-side surface of the first lens and the object-side surface of the second lens may have a convex shape in the same direction. For example, both the image-side surface of the first lens and the object-side surface of the second lens are convex toward the object.

The radius of curvature of the image-side surface of the first lens and the radius of curvature of the object-side surface of the second lens may be the same or similar to each other. For example, a ratio of the radius of curvature of the image-side surface of the first lens and the radius of curvature of the object-side surface of the second lens may be between 0.9 and 1.1.

At least three lenses of the optical imaging system may have a refractive index of 1.57 or higher. At least three lenses of the other lenses (e.g., third to eighth lenses) excluding the first lens and the second lens may have a refractive index of 1.57 or more. For example, the third lens, the fifth lens, and the sixth lens may have a refractive index of 1.57 or higher.

At least two of the at least three lenses may have a refractive index greater than 1.64. For example, the third lens and the fifth lens may have a refractive index greater than 1.64.

Among the first to third lenses, a lens having negative refractive power may have a refractive index greater than 1.67. For example, the third lens may have negative refractive power and may have a refractive index greater than 1.67.

Figure 2:
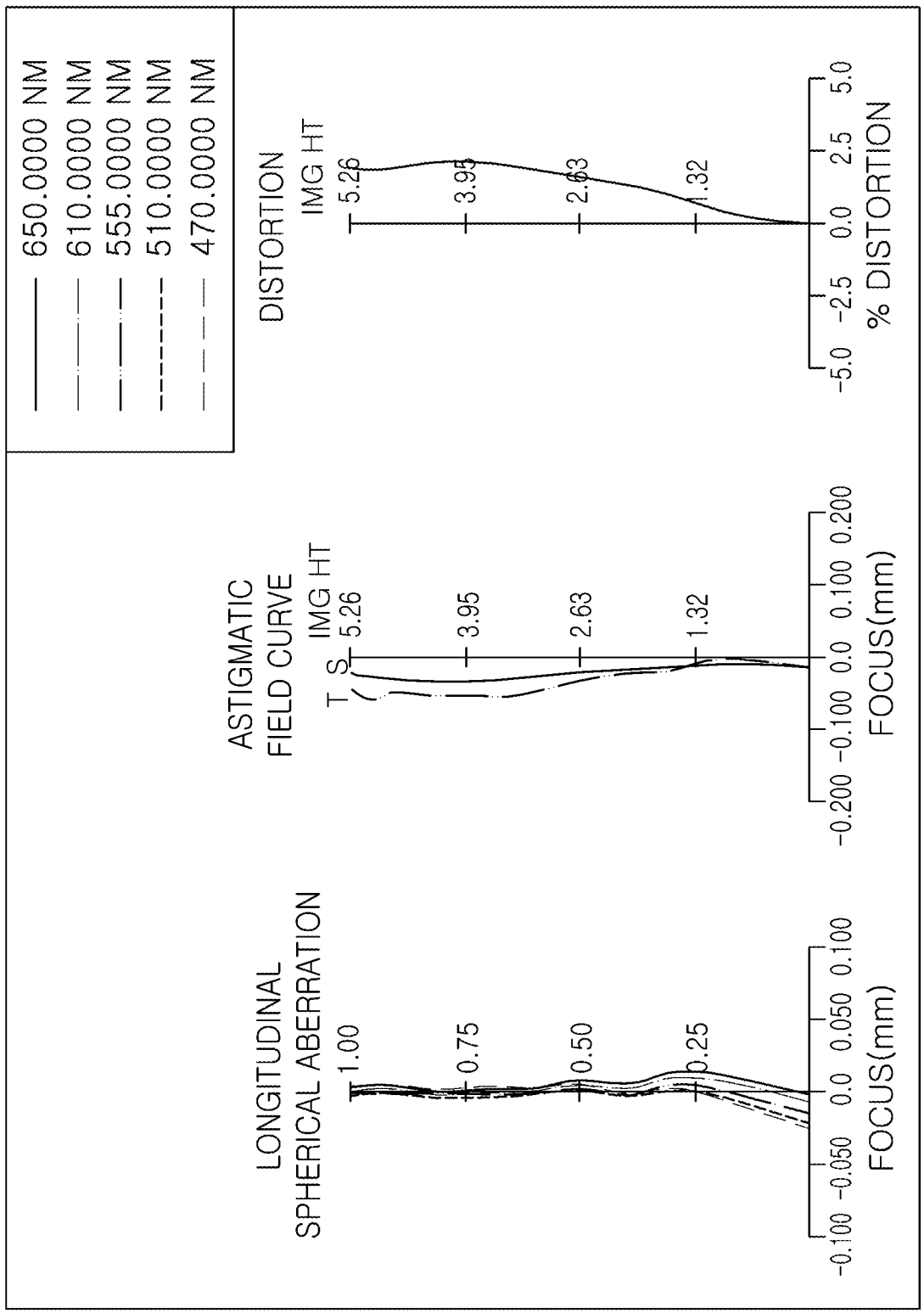
FIG. 2 is a diagram illustrating aberration characteristics of the optical imaging system illustrated in FIG. 1.

An optical imaging system according to a first example will be described with reference to FIGS. 1 and 2.

The optical imaging system according to the first example includes a first lens 110, a second lens 120, a third lens 130, a fourth lens 140, a fifth lens 150, a sixth lens 160, a seventh lens 170 and an eighth lens 180, and may further include an aperture, a filter 190, and an image sensor 191.

Table 1 illustrates the characteristics of each lens (radius of curvature, thickness of the lens or distance between lenses, refractive index, Abbe number, and focal length).

The fifth lens 150 has negative refractive power, the first surface of the fifth lens 150 is convex in the paraxial region, and the second surface of the fifth lens 150 is concave in the paraxial region.

In addition, at least one inflection point is formed on at least one of the first and second surfaces of the fifth lens 150. For example, the first surface of the fifth lens 150 may be convex in the paraxial region and concave in a portion other than the paraxial region. The second surface of the fifth lens 150 may be concave in the paraxial region and convex in a portion other than the paraxial region.

The sixth lens 160 has negative refractive power, the first surface of the sixth lens 160 is convex in the paraxial region, and the second surface of the sixth lens 160 is concave in the paraxial region.

In addition, at least one inflection point is formed on at least one of the first and second surfaces of the sixth lens 160. For example, the first surface of the sixth lens 160 may be convex in the paraxial region and concave in a portion other than the paraxial region. The second surface of the sixth lens 160 may be concave in the paraxial region and convex in a portion other than the paraxial region.

The seventh lens 170 has positive refractive power, the first surface of the seventh lens 170 is convex in the paraxial

TABLE 1

| Surface Number | Remark | Radius of Curvature | Thickness or Distance | Refractive Index | Abbe Number | Focal Length |
|---|---|---|---|---|---|---|
| S1 | First Lens | 2.5375 | 0.9000 | 1.546 | 56.0 | 5.7645 |
| S2 | | 11.4349 | 0.0300 | | | |
| S3 | Second Lens | 11.4075 | 0.2800 | 1.546 | 56.0 | 135.5410 |
| S4 | | 13.3684 | 0.0734 | | | |
| S5 | Third Lens | 8.6590 | 0.2577 | 1.687 | 18.2 | −13.6820 |
| S6 | | 4.4525 | 0.4416 | | | |
| S7 | Fourth Lens | −64.1541 | 0.3310 | 1.546 | 56.0 | 63.8798 |
| S8 | | −22.6415 | 0.2513 | | | |
| S9 | Fifth Lens | 72.1996 | 0.3739 | 1.644 | 23.5 | −44.3466 |
| S10 | | 20.4251 | 0.5468 | | | |
| S11 | Sixth Lens | 10.1493 | 0.4872 | 1.570 | 37.4 | −97.2157 |
| S12 | | 8.4294 | 0.3843 | | | |
| S13 | Seventh Lens | 3.1689 | 0.6929 | 1.537 | 55.7 | 6.8588 |
| S14 | | 21.0604 | 0.6534 | | | |
| S15 | Eighth Lens | 5.8142 | 0.5388 | 1.537 | 55.7 | −5.0932 |
| S16 | | 1.7990 | 0.3438 | | | |
| S17 | Filter | Infinity | 0.2100 | 1.518 | 64.2 | |
| S18 | | Infinity | 0.6900 | | | |
| S19 | Image Plane | Infinity | | | | |

The total focal length f of the optical imaging system according to the first example is 6.3135 mm, Fno is 1.78, FOV is 78.5°, and IMG HT is 5.264 mm.

In the first example, the first lens 110 has positive refractive power, the first surface of the first lens 110 has a convex shape, and the second surface of the first lens 110 has a concave shape.

The second lens 120 has positive refractive power, the first surface of the second lens 120 has a convex shape, and the second surface of the second lens 120 has a concave shape.

The third lens 130 has negative refractive power, the first surface of the third lens 130 has a convex shape, and the second surface of the third lens 130 has a concave shape.

The fourth lens 140 has positive refractive power, the first surface of the fourth lens 140 has a concave shape, and the second surface of the fourth lens 140 has a convex shape.

region, and the second surface of the seventh lens 170 is concave in the paraxial region.

In addition, at least one inflection point is formed on at least one of the first and second surfaces of the seventh lens 170. For example, the first surface of the seventh lens 170 may be convex in the paraxial region and concave in a portion other than the paraxial region. The second surface of the seventh lens 170 may be concave in the paraxial region and convex in a portion other than the paraxial region.

The eighth lens 180 has negative refractive power, the first surface of the eighth lens 180 is convex in the paraxial region, and the second surface of the eighth lens 180 is concave in the paraxial region.

In addition, at least one inflection point is formed on at least one of the first and second surfaces of the eighth lens 180. For example, the first surface of the eighth lens 180 may be convex in a paraxial region and concave in a portion other than the paraxial region. The second surface of the eighth lens 180 may be concave in the paraxial region and convex in a portion other than the paraxial region.

Each surface of the first to eighth lenses 110 to 180 has an aspheric coefficient as illustrated in Table 2. For example, both the object-side and image-side surfaces of the first to eighth lenses 110 to 180 are aspherical.

TABLE 2

| | S1 | S2 | S3 | S4 | S5 | S6 | S7 | S8 |
|---|---|---|---|---|---|---|---|---|
| Conic Constant(K) | −1.013E+00 | 2.303E+01 | 2.304E+01 | 2.258E+01 | 1.844E+01 | 2.190E+00 | 9.500E+01 | 8.785E+01 |
| 4th Coefficient(A) | 4.788E−03 | −6.354E−02 | −6.315E−02 | −4.721E−02 | −7.301E−02 | −3.361E−02 | −1.555E−02 | 3.309E−02 |
| 6th Coefficient(B) | 2.290E−02 | 3.994E−01 | 3.896E−01 | 2.084E−01 | 3.264E−01 | 9.737E−02 | −5.878E−02 | 6.447E−02 |
| 8th Coefficient(C) | −9.755E−02 | 1.792E+00 | 1.763E+00 | −9.244E−01 | 1.587E+00 | −3.006E−01 | 4.488E−01 | 3.278E−01 |
| 10th Coefficient(D) | 2.720E−01 | 4.964E+00 | 4.957E+00 | 2.846E+00 | 5.421E+00 | 4.867E−01 | 2.027E+00 | 1.227E+00 |
| 12th Coefficient(E) | −5.007E−01 | 8.961E+00 | 9.085E+00 | 5.900E+00 | 1.254E+01 | 4.686E−01 | 5.941E+00 | 3.183E+00 |
| 14th Coefficient(F) | 6.282E−01 | 1.107E+01 | 1.139E+01 | 8.478E+00 | 2.018E+01 | 4.146E+00 | 1.186E+01 | 5.786E+00 |
| 16th Coefficient(G) | −5.504E−01 | 9.650E+00 | 1.006E+01 | 8.667E+00 | 2.315E+01 | 9.881E+00 | 1.661E+01 | 7.487E+00 |
| 18th Coefficient(H) | 3.416E−01 | 6.036E+00 | 6.365E+00 | 6.397E+00 | 1.916E+01 | 1.373E+01 | 1.660E+01 | 6.962E+00 |
| 20th Coefficient(J) | −1.508E−01 | 2.719E+00 | 2.895E+00 | 3.420E+00 | 1.148E+01 | 1.254E+01 | 1.189E+01 | 4.658E+00 |
| 22th Coefficient(L) | 4.701E−02 | 8.741E−01 | 9.367E−01 | 1.311E+00 | 4.922E+00 | 7.770E+00 | 6.048E+00 | 2.219E+00 |
| 24th Coefficient(M) | −1.010E−02 | −1.953E−01 | −2.099E−01 | −3.517E−01 | 1.474E+00 | 3.246E+00 | 2.134E+00 | 7.345E−01 |
| 26th Coefficient(N) | 1.423E−03 | 2.878E−02 | 3.085E−02 | 6.256E−02 | 2.923E−01 | −8.772E−01 | −4.959E−01 | 1.603E−01 |
| 28th Coefficient(O) | −1.182E−04 | −2.510E−03 | −2.662E−03 | −6.631E−03 | −3.450E−02 | 1.387E−01 | 6.823E−02 | 2.075E−02 |
| 30th Coefficient(P) | 4.386E−06 | 9.780E−05 | 1.016E−04 | 3.168E−04 | 1.834E−03 | −9.746E−03 | −4.207E−03 | 1.206E−03 |

| | S9 | S10 | S11 | S12 | S13 | S14 | S15 | S16 |
|---|---|---|---|---|---|---|---|---|
| Conic Constant(K) | 9.500E+01 | −2.835E+01 | −3.123E+01 | −9.484E+01 | −5.559E+00 | 2.100E+01 | −7.281E+01 | −8.000E+00 |
| 4th Coefficient(A) | −6.552E−02 | −5.052E−02 | −6.077E−02 | −8.416E−02 | −1.261E−02 | 1.205E−02 | −1.323E−01 | −6.301E−02 |
| 6th Coefficient(B) | 1.046E−01 | 1.591E−02 | 5.331E−02 | 5.642E−02 | 1.854E−02 | 3.432E−02 | 8.544E−02 | 3.322E−02 |
| 8th Coefficient(C) | −4.121E−01 | 2.028E−02 | −6.340E−02 | −5.824E−02 | −2.462E−02 | −4.132E−02 | −4.299E−02 | 1.455E−02 |
| 10th Coefficient(D) | 1.151E+00 | −1.205E−01 | 7.120E−02 | 5.264E−02 | 1.449E−02 | 2.240E−02 | 1.536E−02 | 4.638E−03 |
| 12th Coefficient(E) | −2.231E+00 | 2.593E−01 | −6.151E−02 | −3.332E−02 | −5.261E−03 | −7.658E−03 | −3.740E−03 | −1.067E−03 |
| 14th Coefficient(F) | 3.044E+00 | −3.481E−01 | 3.811E−02 | 1.456E−02 | 1.275E−03 | 1.814E−03 | 6.316E−04 | 1.793E−04 |
| 16th Coefficient(G) | −2.977E+00 | 3.206E−01 | −1.676E−02 | −4.413E−03 | −2.112E−04 | −3.088E−04 | −7.574E−05 | −2.220E−05 |
| 18th Coefficient(H) | 2.109E+00 | −2.094E−01 | 5.220E−03 | 9.296E−04 | 2.388E−05 | 3.830E−05 | 6.541E−06 | 2.029E−06 |
| 20th Coefficient(J) | −1.083E+00 | 9.806E−02 | −1.141E−03 | −1.351E−04 | −1.802E−06 | −3.461E−06 | −4.081E−07 | −1.360E−07 |
| 22th Coefficient(L) | 3.986E−01 | −3.274E−02 | 1.707E−04 | 1.323E−05 | 8.431E−08 | 2.249E−07 | 1.822E−08 | 6.576E−09 |
| 24th Coefficient(M) | −1.023E−01 | 7.617E−03 | −1.654E−05 | −8.249E−07 | −1.885E−09 | −1.022E−08 | −5.675E−10 | −2.228E−10 |
| 26th Coefficient(N) | 1.734E−02 | −1.175E−03 | 9.251E−07 | 2.870E−08 | −1.656E−11 | 3.075E−10 | 1.170E−11 | 5.008E−12 |
| 28th Coefficient(O) | −1.735E−03 | 1.081E−04 | −2.173E−08 | −3.492E−10 | 1.907E−12 | −5.502E−12 | −1.435E−13 | −6.698E−14 |
| 30th Coefficient(P) | 7.711E−05 | −4.505E−06 | −7.816E−11 | −4.120E−12 | −3.109E−14 | 4.425E−14 | 7.911E−16 | 4.030E−16 |

Figure 3:
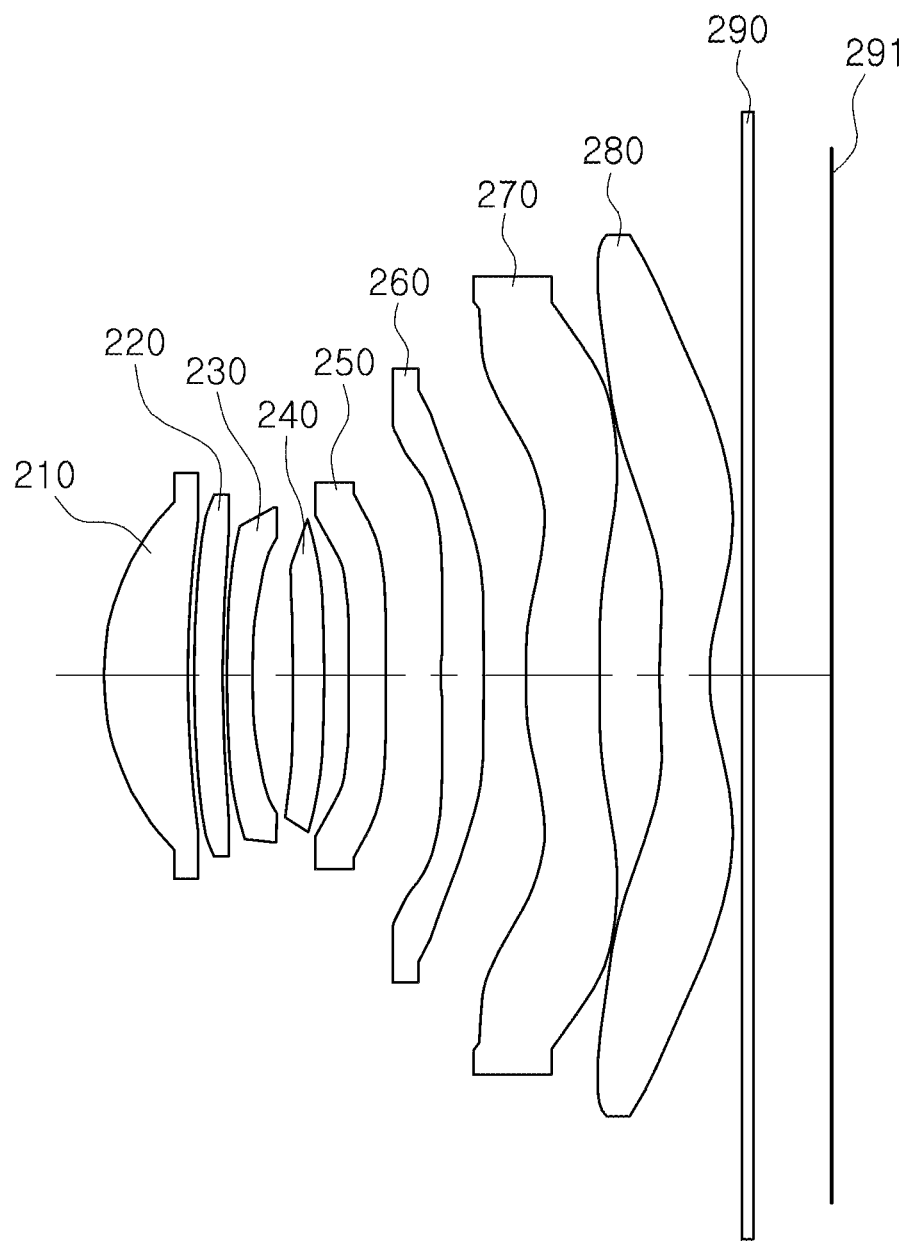
FIG. 3 is a configuration diagram of an optical imaging system according to a second example.
Figure 4:
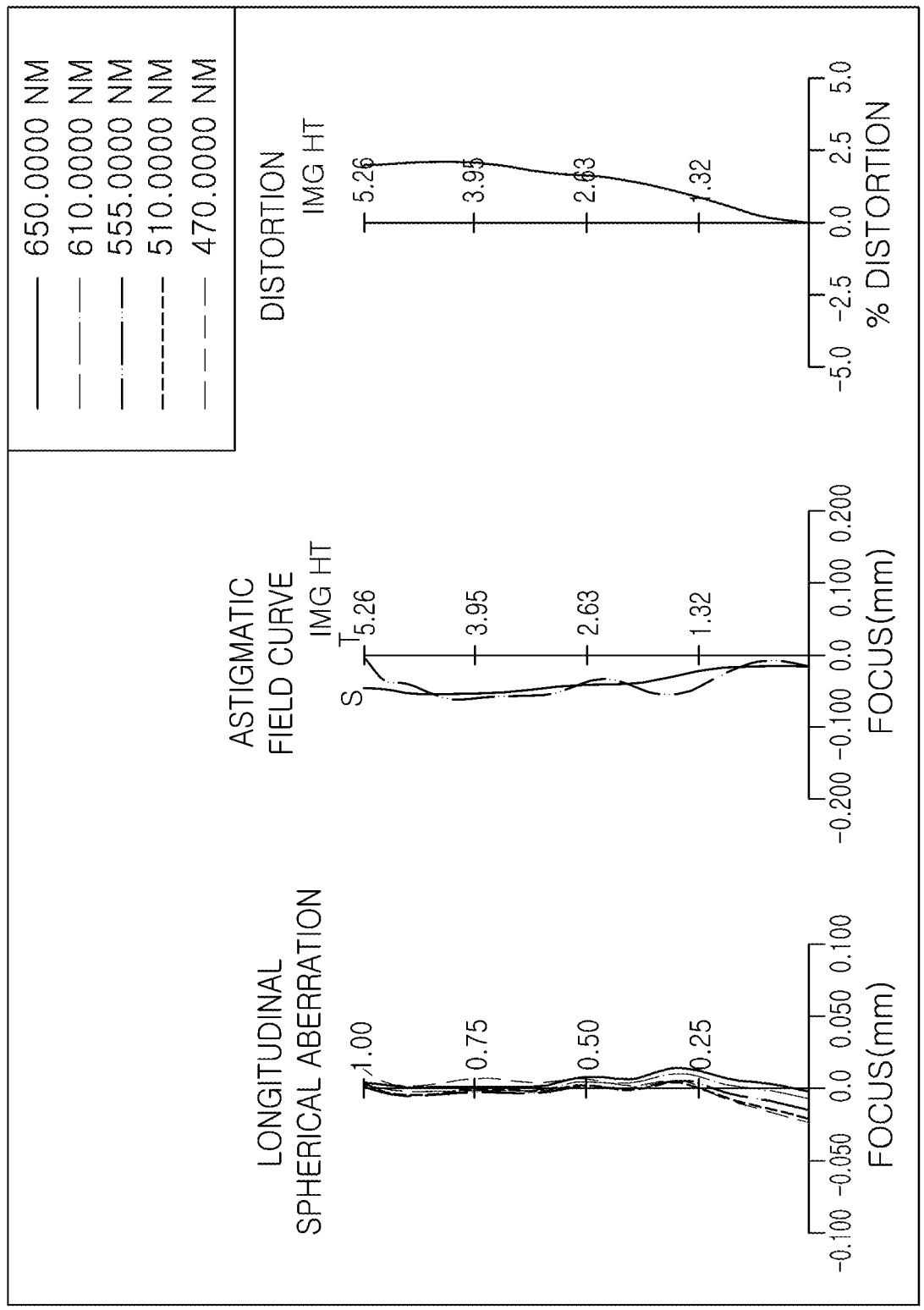
FIG. 4 is a diagram illustrating aberration characteristics of the optical imaging system illustrated in FIG. 3.

An optical imaging system according to a second example will be described with reference to FIGS. 3 and 4.

The optical imaging system according to the second example includes a first lens 210, a second lens 220, a third lens 230, a fourth lens 240, a fifth lens 250, a sixth lens 260, a seventh lens 270 and an eighth lens 280, and may further include an aperture, a filter 290, and an image sensor 291.

Table 3 illustrates the characteristics of each lens (radius of curvature, thickness of the lens or distance between lenses, index of refraction, Abbe number, and focal length).

TABLE 3

| Surface Number | Remark | Radius of Curvature | Thickness or Distance | Refractive Index | Abbe Number | Focal Length |
|---|---|---|---|---|---|---|
| S1 | First Lens | 2.5405 | 0.8598 | 1.546 | 56.0 | 5.8608 |
| S2 | | 10.8360 | 0.0676 | | | |
| S3 | Second Lens | 10.6155 | 0.2872 | 1.546 | 56.0 | 99.4302 |
| S4 | | 13.0684 | 0.0514 | | | |
| S5 | Third Lens | 8.4592 | 0.2500 | 1.687 | 18.2 | −13.7887 |
| S6 | | 4.4150 | 0.4235 | | | |
| S7 | Fourth Lens | −78.0943 | 0.3201 | 1.546 | 56.0 | 81.7006 |
| S8 | | −28.4394 | 0.2533 | | | |
| S9 | Fifth Lens | 50.5987 | 0.3740 | 1.667 | 20.4 | −41.3616 |
| S10 | | 17.7996 | 0.5727 | | | |
| S11 | Sixth Lens | 9.8013 | 0.4348 | 1.570 | 37.4 | 95.0000 |
| S12 | | 11.7731 | 0.4233 | | | |
| S13 | Seventh Lens | 3.5243 | 0.7600 | 1.537 | 55.7 | 7.9755 |
| S14 | | 18.4653 | 0.6278 | | | |
| S15 | Eighth Lens | 4.7724 | 0.5001 | 1.537 | 55.7 | −5.3485 |
| S16 | | 1.7266 | 0.3444 | | | |
| S17 | Filter | Infinity | 0.1100 | 1.518 | 64.2 | |
| S18 | | Infinity | 0.7900 | | | |
| S19 | Image Plane | Infinity | | | | |

The total focal length f of the optical imaging system according to the second example is 6.317 mm, Fno is 1.78, FOV is 78.4°, and IMG HT is 5.264 mm.

In the second example, the first lens 210 has positive refractive power, the first surface of the first lens 210 has a convex shape, and the second surface of the first lens 210 has a concave shape.

The second lens 220 has positive refractive power, the first surface of the second lens 220 has a convex shape, and the second surface of the second lens 220 has a concave shape.

The third lens 230 has negative refractive power, the first surface of the third lens 230 has a convex shape, and the second surface of the third lens 230 has a concave shape.

The fourth lens 240 has positive refractive power, the first surface of the fourth lens 240 has a concave shape, and the second surface of the fourth lens 240 has a convex shape.

The fifth lens 250 has negative refractive power, the first surface of the fifth lens 250 is convex in the paraxial region, and the second surface of the fifth lens 250 is concave in the paraxial region.

In addition, at least one inflection point is formed on at least one of the first and second surfaces of the fifth lens 250. For example, the first surface of the fifth lens 250 may be convex in the paraxial region and concave in a portion other than the paraxial region. In addition, the second surface of the fifth lens 250 may be concave in the paraxial region and convex in a portion other than the paraxial region.

The sixth lens 260 has positive refractive power, the first surface of the sixth lens 260 is convex in the paraxial region, and the second surface of the sixth lens 260 is concave in the paraxial region.

In addition, at least one inflection point is formed on at least one of the first and second surfaces of the sixth lens 260. For example, the first surface of the sixth lens 260 may be convex in the paraxial region and concave in a portion other than the paraxial region. In addition, the second surface of the sixth lens 260 may be concave in the paraxial region and convex in a portion other than the paraxial region.

The seventh lens 270 has positive refractive power, the first surface of the seventh lens 270 is convex in the paraxial region, and the second surface of the seventh lens 270 is concave in the paraxial region.

In addition, at least one inflection point is formed on at least one of the first and second surfaces of the seventh lens 270. For example, the first surface of the seventh lens 270 may be convex in the paraxial region and concave in a portion other than the paraxial region. The second surface of the seventh lens 270 may be concave in the paraxial region and convex in a portion other than the paraxial region.

The eighth lens 280 has negative refractive power, the first surface of the eighth lens 280 is convex in the paraxial region, and the second surface of the eighth lens 280 is concave in the paraxial region.

In addition, at least one inflection point is formed on at least one of the first and second surfaces of the eighth lens 280. For example, the first surface of the eighth lens 280 may be convex in the paraxial region and concave in a portion other than the paraxial region. The second surface of the eighth lens 280 may be concave in the paraxial region and convex in a portion other than the paraxial region.

Each surface of the first to eighth lenses 210 to 280 has an aspheric coefficient as illustrated in Table 4. For example, both the object-side and image-side surfaces of the first to eighth lenses 210 to 280 are aspherical.

TABLE 4

| | S1 | S2 | S3 | S4 | S5 | S6 | S7 | S8 |
|---|---|---|---|---|---|---|---|---|
| Conic Constant(K) | −1.028E+00 | 2.394E+01 | 2.421E+01 | 2.373E+01 | 1.863E+01 | 2.243E+00 | 9.499E+01 | 8.529E+01 |
| 4th Coefficient(A) | 8.585E−03 | −5.147E−02 | −6.061E−02 | −5.937E−02 | −7.992E−02 | −2.817E−02 | −8.135E−03 | −4.006E−02 |
| 6th Coefficient(B) | −1.794E−03 | 2.544E−01 | 2.937E−01 | 2.748E−01 | 4.278E−01 | 8.203E−02 | −1.096E−01 | 1.633E−01 |
| 8th Coefficient(C) | −1.281E−02 | −1.053E+00 | −1.195E+00 | −1.102E+00 | −2.117E+00 | −2.056E−01 | 7.080E−01 | −9.230E−01 |
| 10th Coefficient(D) | 9.070E−02 | 2.878E+00 | 3.312E+00 | 3.175E+00 | 7.156E+00 | −1.608E−01 | −2.904E+00 | 3.403E+00 |
| 12th Coefficient(E) | −2.432E−01 | −5.261E+00 | −6.203E+00 | −6.304E+00 | −1.642E+01 | 3.099E+00 | 7.887E+00 | −8.481E+00 |
| 14th Coefficient(F) | 3.774E−01 | 6.671E+00 | 8.072E+00 | 8.715E+00 | 2.631E+01 | −1.089E+01 | −1.474E+01 | 1.477E+01 |
| 16th Coefficient(G) | −3.802E−01 | −6.036E+00 | −7.487E+00 | −8.551E+00 | −3.009E+01 | 2.152E+01 | 1.944E+01 | −1.837E+01 |
| 18th Coefficient(H) | 2.613E−01 | 3.958E+00 | 5.024E+00 | 6.035E+00 | 2.488E+01 | −2.768E+01 | −1.832E+01 | 1.652E+01 |
| 20th Coefficient(J) | −1.251E−01 | −1.888E+00 | −2.447E+00 | −3.074E+00 | −1.491E+01 | 2.433E+01 | 1.237E+01 | −1.075E+01 |
| 22th Coefficient(L) | 4.181E−02 | 6.492E−01 | 8.567E−01 | 1.120E+00 | 6.413E+00 | −1.479E+01 | −5.931E+00 | 5.011E+00 |
| 24th Coefficient(M) | −9.578E−03 | −1.567E−01 | −2.100E−01 | −2.842E−01 | −1.927E+00 | 6.122E+00 | 1.965E+00 | −1.630E+00 |
| 26th Coefficient(N) | 1.435E−03 | 2.522E−02 | 3.419E−02 | 4.760E−02 | 3.839E−01 | −1.651E+00 | −4.271E−01 | 3.514E−01 |
| 28th Coefficient(O) | −1.268E−04 | −2.428E−03 | −3.317E−03 | −4.713E−03 | −4.555E−02 | 2.616E−01 | 5.463E−02 | −4.508E−02 |
| 30th Coefficient(P) | 5.023E−06 | 1.058E−04 | 1.450E−04 | 2.079E−04 | 2.434E−03 | −1.849E−02 | −3.107E−03 | 2.604E−03 |

| | S9 | S10 | S11 | S12 | S13 | S14 | S15 | S16 |
|---|---|---|---|---|---|---|---|---|
| Conic Constant(K) | 6.026E+01 | −1.595E+01 | −2.672E+01 | −9.477E+01 | −5.486E+00 | 1.902E+01 | −5.048E+01 | −6.638E+00 |
| 4th Coefficient(A) | −6.290E−02 | −4.446E−02 | −6.263E−02 | −8.819E−02 | −9.409E−03 | 1.972E−02 | −1.170E−01 | −7.330E−02 |
| 6th Coefficient(B) | 8.909E−02 | −3.180E−02 | 6.507E−02 | 6.380E−02 | 8.806E−03 | 2.048E−02 | 6.663E−02 | 3.946E−02 |
| 8th Coefficient(C) | −3.777E−01 | 2.124E−01 | −8.486E−02 | −6.296E−02 | −1.445E−02 | −2.912E−02 | −3.047E−02 | −1.803E−02 |
| 10th Coefficient(D) | 1.183E+00 | −6.101E−01 | 9.342E−02 | 5.133E−02 | 7.618E−03 | 1.585E−02 | 1.039E−02 | 6.065E−03 |
| 12th Coefficient(E) | −2.616E+00 | 1.099E+00 | −7.699E−02 | −2.904E−02 | −2.130E−03 | −5.318E−03 | −2.489E−03 | −1.471E−03 |
| 14th Coefficient(F) | 4.124E+00 | −1.354E+00 | 4.604E−02 | 1.110E−02 | 2.831E−04 | 1.230E−03 | 4.234E−04 | 2.587E−04 |
| 16th Coefficient(G) | −4.715E+00 | 1.182E+00 | −1.990E−02 | −2.763E−03 | 1.330E−05 | −2.045E−04 | −5.232E−05 | −3.316E−05 |
| 18th Coefficient(H) | 3.946E+00 | −7.439E−01 | 6.212E−03 | 4.024E−04 | −1.283E−05 | 2.484E−05 | 4.765E−06 | 3.100E−06 |
| 20th Coefficient(J) | −2.416E+00 | 3.383E−01 | −1.389E−03 | −1.809E−05 | 2.542E−06 | −2.206E−06 | −3.212E−07 | −2.103E−07 |

TABLE 4-continued

| | | | | | | | |
|---|---|---|---|---|---|---|---|
| 22th Coefficient(L) | 1.068E+00 | −1.102E−01 | 2.180E−04 | −4.879E−06 | −2.835E−07 | 1.414E−07 | 1.588E−08 | 1.021E−08 |
| 24th Coefficient(M) | −3.320E−01 | 2.508E−02 | −2.313E−05 | 1.090E−06 | 1.981E−08 | −6.370E−09 | −5.613E−10 | −3.445E−10 |
| 26th Coefficient(N) | 6.865E−02 | −3.785E−03 | 1.547E−06 | −1.031E−07 | −8.615E−10 | 1.909E−10 | 1.343E−11 | 7.653E−12 |
| 28th Coefficient(O) | −8.469E−03 | 3.406E−04 | −5.686E−08 | 4.966E−09 | 2.143E−11 | −3.415E−12 | −1.952E−13 | −1.005E−13 |
| 30th Coefficient(P) | 4.710E−04 | −1.384E−05 | 8.141E−10 | −9.939E−11 | −2.336E−13 | 2.759E−14 | 1.301E−15 | 5.889E−16 |

Figure 5:
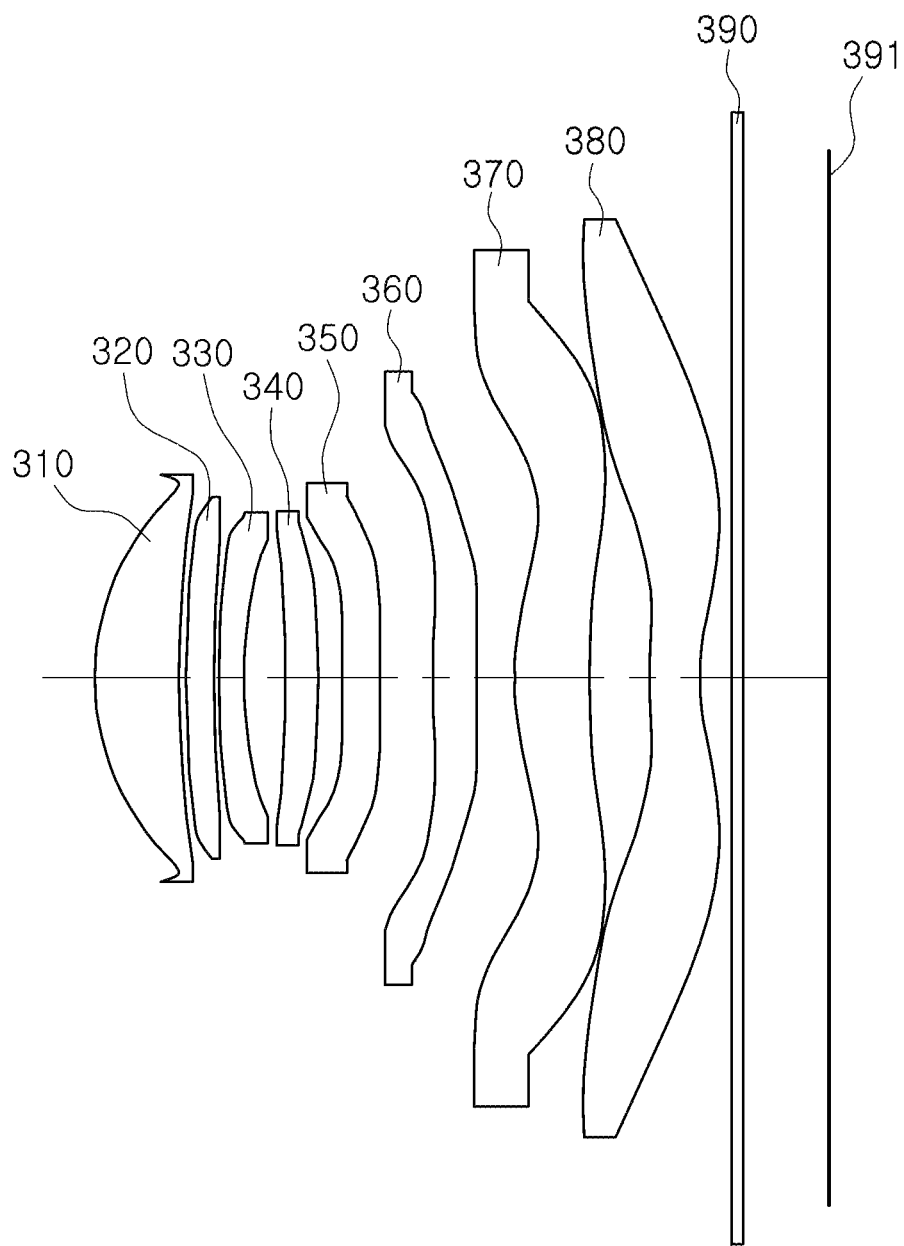
FIG. 5 is a configuration diagram of an optical imaging system according to a third example.
Figure 6:
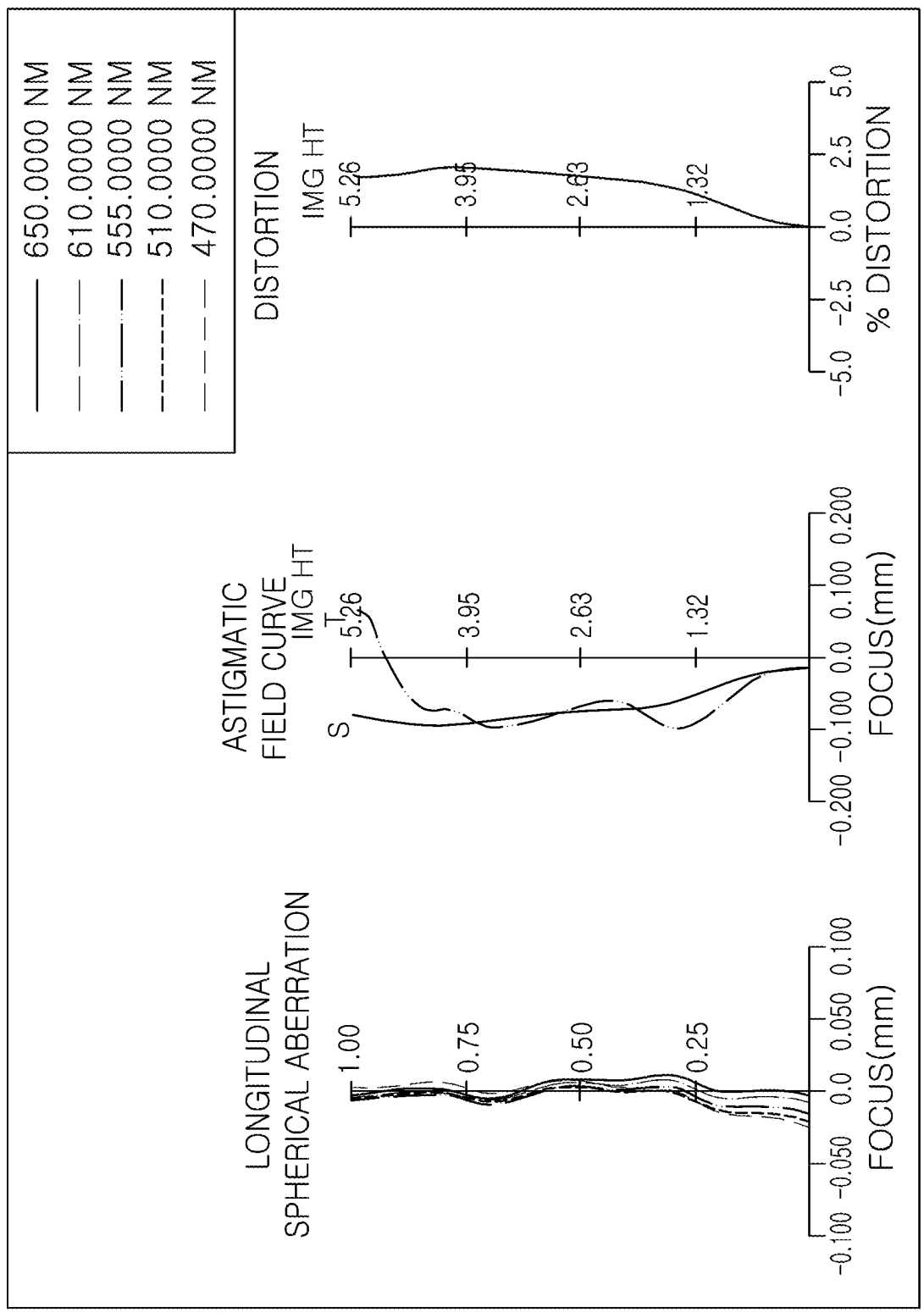
FIG. 6 is a diagram illustrating aberration characteristics of the optical imaging system illustrated in FIG. 5.

An optical imaging system according to a third example will be described with reference to FIGS. 5 and 6.

An optical imaging system according to the third example includes a first lens 310, a second lens 320, a third lens 330, a fourth lens 340, a fifth lens 350, a sixth lens. 360, a seventh lens 370 and an eighth lens 380, and may further include an aperture, a filter 390, and an image sensor 391.

Table 5 illustrates the characteristics of each lens (radius of curvature, thickness of the lens or distance between lenses, index of refraction, Abbe number, and focal length).

TABLE 5

| Surface Number | Remark | Radius of Curvature | Thickness or Distance | Refractive Index | Abbe Number | Focal Length |
|---|---|---|---|---|---|---|
| S1 | First Lens | 2.5551 | 0.8612 | 1.546 | 56.0 | 5.8983 |
| S2 | | 10.8782 | 0.0688 | | | |
| S3 | Second Lens | 10.7408 | 0.2917 | 1.546 | 56.0 | 85.0000 |
| S4 | | 13.8394 | 0.0546 | | | |
| S5 | Third Lens | 8.8307 | 0.2500 | 1.677 | 19.2 | −13.5679 |
| S6 | | 4.4507 | 0.4250 | | | |
| S7 | Fourth Lens | −58.6231 | 0.3261 | 1.546 | 56.0 | 68.1768 |
| S8 | | −22.8178 | 0.2570 | | | |
| S9 | Fifth Lens | 175.1394 | 0.3746 | 1.667 | 20.4 | −34.2789 |
| S10 | | 20.2045 | 0.5493 | | | |
| S11 | Sixth Lens | 9.8809 | 0.4399 | 1.570 | 37.4 | −204.7188 |
| S12 | | 8.9626 | 0.4003 | | | |
| S13 | 제 7 렌즈 | 3.0885 | 0.7604 | 1.537 | 55.7 | 6.6804 |
| S14 | | 20.3958 | 0.6198 | | | |
| S15 | Eighth Lens | 5.7945 | 0.5000 | 1.537 | 55.7 | −5.4563 |
| S16 | | 1.8864 | 0.3444 | | | |
| S17 | Filter | Infinity | 0.1100 | 1.518 | 64.2 | |
| S18 | | Infinity | 0.8670 | | | |
| S19 | Image Plane | Infinity | 0.0000 | | | |

The total focal length f of the optical imaging system according to the third example is 6.3285 mm, Fno is 1.83, FOV is 78.4°, and IMG HT is 5.264 mm.

In the third example, the first lens 310 has positive refractive power, the first surface of the first lens 310 has a convex shape, and the second surface of the first lens 310 has a concave shape.

The second lens 320 has positive refractive power, the first surface of the second lens 320 has a convex shape, and the second surface of the second lens 320 has a concave shape.

The third lens 330 has negative refractive power, the first surface of the third lens 330 has a convex shape, and the second surface of the third lens 330 has a concave shape.

The fourth lens 340 has positive refractive power, the first surface of the fourth lens 340 is concave, and the second surface of the fourth lens 340 is convex.

The fifth lens 350 has negative refractive power, the first surface of the fifth lens 350 has a convex shape in the paraxial region, and the second surface of the fifth lens 350 has a concave shape in the paraxial region.

In addition, at least one inflection point is formed on at least one of the first and second surfaces of the fifth lens 350. For example, the first surface of the fifth lens 350 may be convex in a paraxial region and concave in a portion other than the paraxial region. The second surface of the fifth lens 350 may be concave in the paraxial region and convex in a portion other than the paraxial region.

The sixth lens 360 has negative refractive power, the first surface of the sixth lens 360 has a convex shape in the paraxial region, and the second surface of the sixth lens 360 has a concave shape in the paraxial region.

In addition, at least one inflection point is formed on at least one of the first and second surfaces of the sixth lens 360. For example, the first surface of the sixth lens 360 may be convex in a paraxial region and concave in a portion other than the paraxial region. The second surface of the sixth lens 360 may be concave in the paraxial region and convex in a portion other than the paraxial region.

The seventh lens 370 has positive refractive power, the first surface of the seventh lens 370 has a convex shape in the paraxial region, and the second surface of the seventh lens 370 has a concave shape in the paraxial region.

In addition, at least one inflection point is formed on at least one of the first and second surfaces of the seventh lens 370. For example, the first surface of the seventh lens 370 may be convex in the paraxial region and concave in a portion other than the paraxial region. The second surface of the seventh lens 370 may be concave in the paraxial region and convex in a portion other than the paraxial region.

The eighth lens 380 has negative refractive power, the first surface of the eighth lens 380 is convex in the paraxial region, and the second surface of the eighth lens 380 is concave in the paraxial region.

In addition, at least one inflection point is formed on at least one of the first and second surfaces of the eighth lens 380. For example, the first surface of the eighth lens 380 may be convex in a paraxial region and concave in a portion other than the paraxial region. The second surface of the eighth lens 380 may be concave in the paraxial region and convex in a portion other than the paraxial region.

Each surface of the first to eighth lenses 310 to 380 has an aspheric coefficient as illustrated in Table 6. For example, both the object-side surface and the image-side surface of the first to eighth lenses 310 to 380 are aspherical.

TABLE 6

| | S1 | S2 | S3 | S4 | S5 | S6 | S7 | S8 |
|---|---|---|---|---|---|---|---|---|
| Conic Constant(K) | −1.025E+00 | 2.348E+01 | 2.382E+01 | 2.346E+01 | 1.853E+01 | 2.151E+00 | 9.500E+01 | 8.988E+01 |
| 4th Coefficient(A) | 1.253E−02 | −6.616E−02 | −7.590E−02 | −5.914E−02 | −9.376E−02 | −2.970E−02 | −1.679E−02 | −5.890E−02 |
| 6th Coefficient(B) | −2.664E−02 | 4.044E−01 | 4.754E−01 | 3.385E−01 | 5.890E−01 | 8.007E−02 | −1.261E−02 | 3.541E−01 |
| 8th Coefficient(C) | 6.788E−02 | −1.734E+00 | −2.093E+00 | −1.545E+00 | −3.030E+00 | −7.705E−02 | 8.914E−02 | −1.977E+00 |
| 10th Coefficient(D) | −6.576E−02 | 4.664E+00 | 5.861E+00 | 4.576E+00 | 1.016E+01 | −1.093E+00 | −3.767E−01 | 7.057E+00 |
| 12th Coefficient(E) | −4.844E−02 | −8.280E+00 | −1.092E+01 | −9.005E+00 | −2.285E+01 | 6.588E+00 | 8.964E−01 | −1.696E+01 |
| 14th Coefficient(F) | 2.129E−01 | 1.015E+01 | 1.412E+01 | 1.225E+01 | 3.583E+01 | −1.900E+01 | −1.175E+00 | 2.846E+01 |
| 16th Coefficient(G) | −2.808E−01 | −8.850E+00 | −1.304E+01 | −1.188E+01 | −4.019E+01 | 3.409E+01 | 6.006E−01 | −3.413E+01 |
| 18th Coefficient(H) | 2.154E−01 | 5.572E+00 | 8.733E+00 | 8.336E+00 | 3.269E+01 | −4.115E+01 | 5.591E−01 | 2.960E+01 |
| 20th Coefficient(J) | −1.077E−01 | −2.541E+00 | −4.250E+00 | −4.256E+00 | −1.931E+01 | 3.445E+01 | −1.279E+00 | −1.859E+01 |
| 22th Coefficient(L) | 3.622E−02 | 8.322E−01 | 1.488E+00 | 1.567E+00 | 8.201E+00 | −2.009E+01 | 1.114E+00 | 8.365E+00 |
| 24th Coefficient(M) | −8.140E−03 | −1.907E−01 | −3.652E−01 | −4.060E−01 | −2.439E+00 | 8.018E+00 | −5.598E−01 | −2.629E+00 |
| 26th Coefficient(N) | 1.173E−03 | 2.901E−02 | 5.961E−02 | 7.020E−02 | 4.821E−01 | −2.090E+00 | 1.697E−01 | 5.476E−01 |
| 28th Coefficient(O) | −9.792E−05 | −2.631E−03 | −5.806E−03 | −7.277E−03 | −5.684E−02 | 3.209E−01 | −2.893E−02 | −6.792E−02 |
| 30th Coefficient(P) | 3.600E−06 | 1.077E−04 | 2.553E−04 | 3.419E−04 | 3.025E−03 | −2.201E−02 | 2.138E−03 | 3.796E−03 |

| | S9 | S10 | S11 | S12 | S13 | S14 | S15 | S16 |
|---|---|---|---|---|---|---|---|---|
| Conic Constant(K) | 9.280E+01 | −1.581E+01 | −2.540E+01 | −9.500E+01 | −5.807E+00 | 1.978E+01 | −5.911E+01 | −6.956E+00 |
| 4th Coefficient(A) | −6.740E−02 | −5.667E−02 | −6.735E−02 | −8.232E−02 | −9.401E−03 | 1.630E−02 | −1.199E−01 | −6.945E−02 |
| 6th Coefficient(B) | 1.465E−01 | 8.055E−02 | 9.182E−02 | 4.546E−02 | 8.883E−03 | 2.546E−02 | 7.048E−02 | 3.481E−02 |
| 8th Coefficient(C) | −6.552E−01 | −2.583E−01 | −1.553E−01 | −3.645E−02 | −1.316E−02 | −3.268E−02 | −3.372E−02 | −1.487E−02 |
| 10th Coefficient(D) | 1.976E+00 | 5.844E−01 | 2.016E−01 | 2.712E−02 | 6.351E−03 | 1.746E−02 | 1.199E−02 | 4.712E−03 |

TABLE 6-continued

| | | | | | | | | |
|---|---|---|---|---|---|---|---|---|
| 12th Coefficient(E) | −4.134E+00 | −9.222E−01 | −1.846E−01 | −1.412E−02 | −1.574E−03 | −5.843E−03 | −2.960E−03 | −1.084E−03 |
| 14th Coefficient(F) | 6.178E+00 | 1.037E+00 | 1.195E−01 | 4.816E−03 | 1.543E−04 | 1.359E−03 | 5.106E−04 | 1.828E−04 |
| 16th Coefficient(G) | −6.728E+00 | −8.481E−01 | −5.534E−02 | −9.565E−04 | 2.655E−05 | −2.285E−04 | −6.278E−05 | −2.279E−05 |
| 18th Coefficient(H) | 5.386E+00 | 5.084E−01 | 1.849E−02 | 5.207E−05 | −1.204E−05 | 2.815E−05 | 5.578E−06 | 2.104E−06 |
| 20th Coefficient(J) | −3.165E+00 | −2.233E−01 | −4.450E−03 | 2.591E−05 | 2.097E−06 | −2.538E−06 | −3.592E−07 | −1.428E−07 |
| 22th Coefficient(L) | 1.347E+00 | 7.095E−02 | 7.623E−04 | −8.025E−06 | −2.177E−07 | 1.651E−07 | 1.663E−08 | 7.005E−09 |
| 24th Coefficient(M) | −4.034E−01 | −1.585E−02 | −9.037E−05 | 1.146E−06 | 1.443E−08 | −7.524E−09 | −5.395E−10 | −2.407E−10 |
| 26th Coefficient(N) | 8.050E−02 | 2.359E−03 | 7.028E−06 | −9.336E−08 | −6.009E−10 | 2.274E−10 | 1.166E−11 | 5.482E−12 |
| 28th Coefficient(O) | −9.591E−03 | −2.096E−04 | −3.218E−07 | 4.180E−09 | 1.438E−11 | −4.088E−12 | −1.507E−13 | −7.415E−14 |
| 30th Coefficient(P) | 5.153E−04 | 8.387E−06 | 6.564E−09 | −8.027E−11 | −1.512E−13 | 3.304E−14 | 8.830E−16 | 4.502E−16 |

Figure 7:
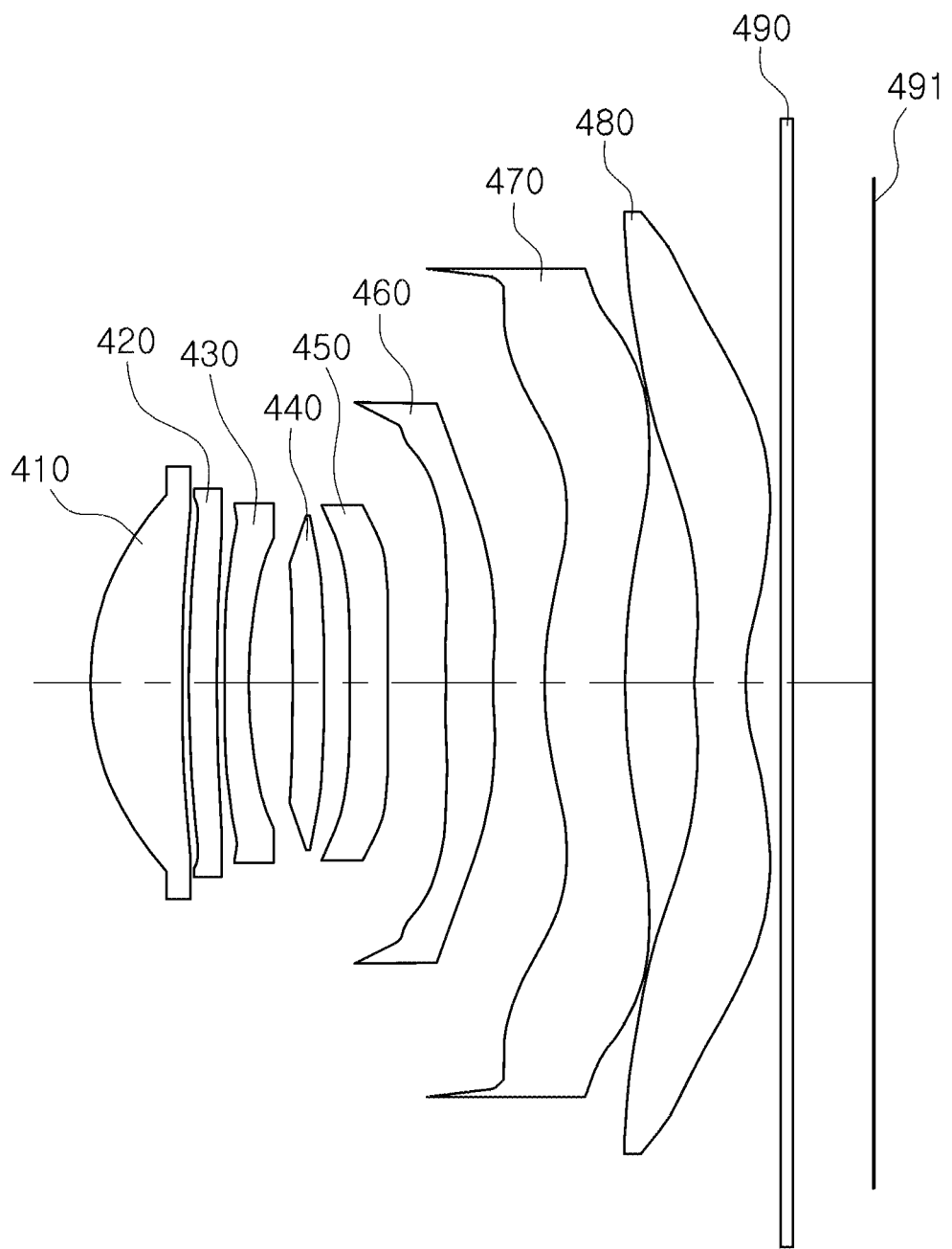
FIG. 7 is a configuration diagram of an optical imaging system according to a fourth example.
Figure 8:
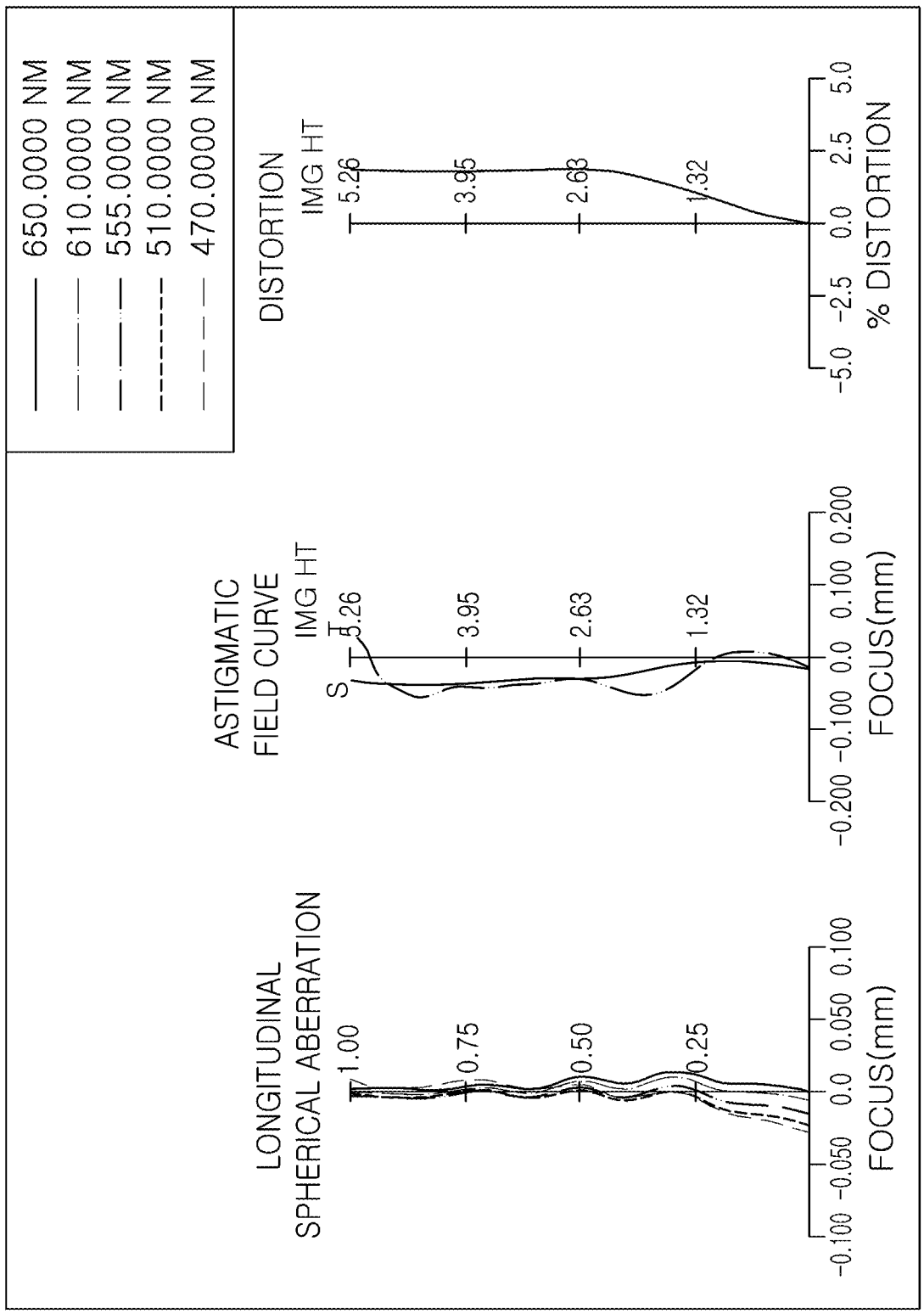
FIG. 8 is a diagram illustrating aberration characteristics of the optical imaging system illustrated in FIG. 7.

An optical imaging system according to a fourth example will be described with reference to FIGS. 7 and 8.

An optical imaging system according to the fourth example includes a first lens 410, a second lens 420, a third lens 430, a fourth lens 440, a fifth lens 450, a sixth lens 460, a seventh lens 470 and an eighth lens 480, and may further include an aperture, a filter 490, and an image sensor 491.

Table 7 illustrates the characteristics of each lens (radius of curvature, thickness or distance between lenses, index of refraction, Abbe number, and focal length).

The total focal length f of the optical imaging system according to the fourth example is 6.8256 mm, Fno is 1.78, FOV is 74.2°, and IMG HT is 5.264 mm.

In the fourth example, the first lens 410 has positive refractive power, the first surface of the first lens 410 is convex, and the second surface of the first lens 410 is concave.

TABLE 7

| Surface Number | Remark | Radius of Curvature | Thickness or Distance | Refractive Index | Abbe Number | Focal Length |
|---|---|---|---|---|---|---|
| S1 | First Lens | 2.7305 | 0.9274 | 1.546 | 56.0 | 6.1841 |
| S2 | | 12.5387 | 0.0751 | | | |
| S3 | Second Lens | 12.2159 | 0.2810 | 1.546 | 56.0 | 128.6972 |
| S4 | | 14.6652 | 0.0842 | | | |
| S5 | Third Lens | 9.3025 | 0.2501 | 1.687 | 18.2 | −14.5712 |
| S6 | | 4.7691 | 0.4505 | | | |
| S7 | Fourth Lens | −114.3982 | 0.3179 | 1.546 | 56.0 | −489.9740 |
| S8 | | −200.0000 | 0.2756 | | | |
| S9 | Fifth Lens | 26.7068 | 0.3809 | 1.667 | 20.4 | −62.0890 |
| S10 | | 16.1429 | 0.5943 | | | |
| S11 | Sixth Lens | 9.8889 | 0.4997 | 1.570 | 37.4 | 56.1534 |
| S12 | | 14.0436 | 0.5365 | | | |
| S13 | Seventh Lens | 3.7344 | 0.8233 | 1.537 | 55.7 | 8.8084 |
| S14 | | 16.4203 | 0.7142 | | | |
| S15 | Eighth Lens | 5.6728 | 0.5085 | 1.537 | 55.7 | −5.9073 |
| S16 | | 1.9699 | 0.3698 | | | |
| S17 | Filter | Infinity | 0.1100 | 1.518 | 64.2 | |
| S18 | | Infinity | 0.8430 | | | |
| S19 | Image Plane | Infinity | 0.0000 | | | |

The second lens 420 has positive refractive power, the first surface of the second lens 420 has a convex shape, and the second surface of the second lens 420 has a concave shape.

The third lens 430 has negative refractive power, a first surface of the third lens 430 has a convex shape, and a second surface of the third lens 430 has a concave shape.

The fourth lens 440 has negative refractive power, a first surface of the fourth lens 440 has a concave shape, and a second surface of the fourth lens 440 has a convex shape.

The fifth lens 450 has negative refractive power, the first surface of the fifth lens 450 is convex in the paraxial region, and the second surface of the fifth lens 450 is concave in the paraxial region.

In addition, at least one inflection point is formed on at least one of the first and second surfaces of the fifth lens 450. For example, the first surface of the fifth lens 450 may be convex in the paraxial region and concave in a portion other than the paraxial region. The second surface of the fifth lens 450 may be concave in the paraxial region and convex in a portion other than the paraxial region.

The sixth lens 460 has positive refractive power, the first surface of the sixth lens 460 has a convex shape in the paraxial region, and the second surface of the sixth lens 460 has a concave shape in the paraxial region.

In addition, at least one inflection point is formed on at least one of the first and second surfaces of the sixth lens 460. For example, the first surface of the sixth lens 460 may be convex in a paraxial region and concave in a portion other than the paraxial region. The second surface of the fifth lens 450 may be concave in the paraxial region and convex in a portion other than the paraxial region.

The seventh lens 470 has positive refractive power, the first surface of the seventh lens 470 has a convex shape in the paraxial region, and the second surface of the seventh lens 470 has a concave shape in the paraxial region.

In addition, at least one inflection point is formed on at least one of the first and second surfaces of the seventh lens 470. For example, the first surface of the seventh lens 470 may be convex in the paraxial region and concave in a portion other than the paraxial region. The second surface of the seventh lens 470 may be concave in the paraxial region and convex in a portion other than the paraxial region.

The eighth lens 480 has negative refractive power, the first surface of the eighth lens 480 has a convex shape in the paraxial region, and the second surface of the eighth lens 480 has a concave shape in the paraxial region.

In addition, at least one inflection point is formed on at least one of the first and second surfaces of the eighth lens 480. For example, the first surface of the eighth lens 480 may be convex in a paraxial region and concave in a portion other than the paraxial region. The second surface of the eighth lens 480 may be concave in the paraxial region and convex in a portion other than the paraxial region.

Each surface of the first to eighth lenses 410 to 480 has an aspheric coefficient as illustrated in Table 8. For example, both the object-side and image-side surfaces of the first to eighth lenses 410 to 480 are aspherical.

TABLE 8

| | S1 | S2 | S3 | S4 | S5 | S6 | S7 | S8 |
|---|---|---|---|---|---|---|---|---|
| Conic Constant(K) | −1.026E+00 | 2.390E+01 | 2.413E+01 | 2.373E+01 | 1.868E+01 | 2.271E+00 | 7.919E+01 | 9.288E+01 |
| 4th Coefficient(A) | 5.812E−03 | −4.307E−02 | −4.957E−02 | −5.692E−02 | −6.199E−02 | −1.394E−02 | 2.065E−04 | −2.141E−02 |
| 6th Coefficient(B) | 7.604E−03 | 1.910E−01 | 2.020E−01 | 2.660E−01 | 2.715E−01 | −5.283E−02 | −1.258E−01 | 3.031E−02 |
| 8th Coefficient(C) | −4.778E−02 | −6.711E−01 | −6.664E−01 | −9.823E−01 | −1.137E+00 | 5.198E−01 | 6.171E−01 | −1.992E−01 |
| 10th Coefficient(D) | 1.621E−01 | 1.531E+00 | 1.475E+00 | 2.486E+00 | 3.274E+00 | −2.371E+00 | −1.936E+00 | 7.861E−01 |
| 12th Coefficient(E) | −3.252E−01 | −2.327E+00 | −2.173E+00 | −4.274E+00 | −6.392E+00 | 6.789E+00 | 4.042E+00 | −1.989E+00 |
| 14th Coefficient(F) | 4.216E−01 | 2.451E+00 | 2.190E+00 | 5.100E+00 | 8.694E+00 | −1.309E+01 | −5.811E+00 | 3.394E+00 |
| 16th Coefficient(G) | −3.714E−01 | −1.842E+00 | −1.546E+00 | −4.318E+00 | −8.427E+00 | 1.760E+01 | 5.880E+00 | −4.032E+00 |
| 18th Coefficient(H) | 2.289E−01 | 1.004E+00 | 7.739E−01 | 2.631E+00 | 5.898E+00 | −1.683E+01 | −4.225E+00 | 3.398E+00 |
| 20th Coefficient(J) | −9.976E−02 | −3.992E−01 | −2.749E−01 | −1.157E+00 | −2.988E+00 | 1.151E+01 | 2.149E+00 | −2.043E+00 |
| 22th Coefficient(L) | 3.065E−02 | 1.146E−01 | 6.817E−02 | 3.640E−01 | 1.085E+00 | −5.594E+00 | −7.595E−01 | 8.709E−01 |
| 24th Coefficient(M) | −6.499E−03 | −2.319E−02 | −1.137E−02 | −7.980E−02 | −2.754E−01 | 1.885E+00 | 1.793E−01 | −2.570E−01 |
| 26th Coefficient(N) | 9.052E−04 | 3.137E−03 | 1.181E−03 | 1.156E−02 | 4.632E−02 | −4.187E−01 | −2.607E−02 | 4.992E−02 |

TABLE 8-continued

|  |  |  |  |  |  |  |  |  |
|---|---|---|---|---|---|---|---|---|
| 28th Coefficient(O) | −7.458E−05 | −2.549E−04 | −6.487E−05 | −9.938E−04 | −4.636E−03 | 5.514E−02 | 1.960E−03 | −5.742E−03 |
| 30th Coefficient(P) | 2.755E−06 | 9.409E−06 | 1.183E−06 | 3.825E−05 | 2.089E−04 | −3.261E−03 | −4.476E−05 | 2.962E−04 |

|  | S9 | S10 | S11 | S12 | S13 | S14 | S15 | S16 |
|---|---|---|---|---|---|---|---|---|
| Conic Constant(K) | 3.006E+01 | −1.124E+01 | −2.796E+01 | −9.080E+01 | −5.012E+00 | 1.126E+01 | −8.324E+01 | −6.800E+00 |
| 4th Coefficient(A) | −5.372E−02 | −3.851E−02 | −4.731E−02 | −6.608E−02 | −4.772E−03 | 2.672E−02 | −5.732E−02 | −4.412E−02 |
| 6th Coefficient(B) | 1.027E−01 | −1.390E−03 | 3.527E−02 | 2.673E−02 | −5.100E−03 | −5.679E−03 | 1.165E−02 | 1.437E−02 |
| 8th Coefficient(C) | −4.378E−01 | 5.356E−02 | −3.564E−02 | −1.088E−02 | 2.889E−03 | −1.373E−03 | 1.784E−03 | −4.179E−03 |
| 10th Coefficient(D) | 1.264E+00 | −1.515E−01 | 3.583E−02 | 3.426E−03 | −2.200E−03 | 7.818E−04 | −1.831E−03 | 1.042E−03 |
| 12th Coefficient(E) | −2.506E+00 | 2.428E−01 | −2.871E−02 | −1.284E−06 | 1.068E−03 | −1.662E−04 | 5.657E−04 | −2.174E−04 |
| 14th Coefficient(F) | 3.506E+00 | −2.594E−01 | 1.673E−02 | −7.804E−04 | −3.297E−04 | 2.216E−05 | −1.022E−04 | 3.506E−05 |
| 16th Coefficient(G) | −3.528E+00 | 1.947E−01 | −6.968E−03 | 4.931E−04 | 6.923E−05 | −2.426E−06 | 1.219E−05 | −4.137E−06 |
| 18th Coefficient(H) | 2.583E+00 | −1.051E−01 | 2.077E−03 | −1.694E−04 | −1.022E−05 | 2.911E−07 | −1.005E−06 | 3.496E−07 |
| 20th Coefficient(J) | −1.376E+00 | 4.094E−02 | −4.416E−04 | 3.699E−05 | 1.070E−06 | −3.585E−08 | 5.823E−08 | −2.096E−08 |
| 22th Coefficient(L) | 5.277E−01 | −1.143E−02 | 6.612E−05 | −5.341E−06 | −7.897E−08 | 3.444E−09 | −2.369E−09 | 8.809E−10 |
| 24th Coefficient(M) | −1.418E−01 | 2.228E−03 | −6.768E−06 | 5.096E−07 | 4.012E−09 | −2.237E−10 | 6.630E−11 | −2.535E−11 |
| 26th Coefficient(N) | 2.530E−02 | −2.882E−04 | 4.481E−07 | −3.096E−08 | −1.334E−10 | 9.125E−12 | −1.216E−12 | 4.760E−13 |
| 28th Coefficient(O) | −2.692E−03 | 2.224E−05 | −1.718E−08 | 1.086E−09 | 2.613E−12 | −2.111E−13 | 1.315E−14 | −5.268E−15 |
| 30th Coefficient(P) | 1.291E−04 | −7.759E−07 | 2.877E−10 | −1.678E−11 | −2.286E−14 | 2.114E−15 | −6.362E−17 | 2.620E−17 |

Figure 9:
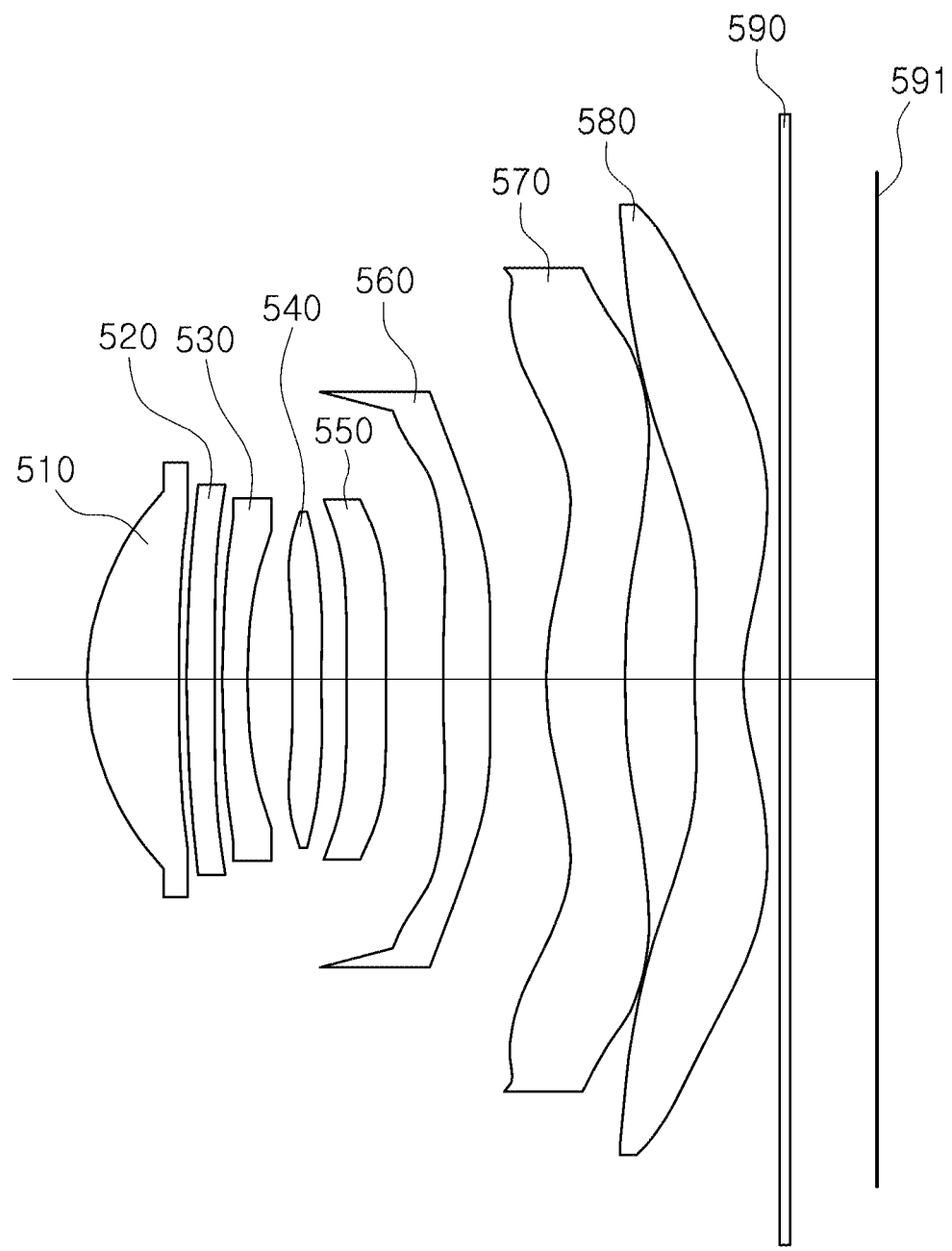
FIG. 9 is a configuration diagram of an optical imaging system according to a fifth example.
Figure 10:
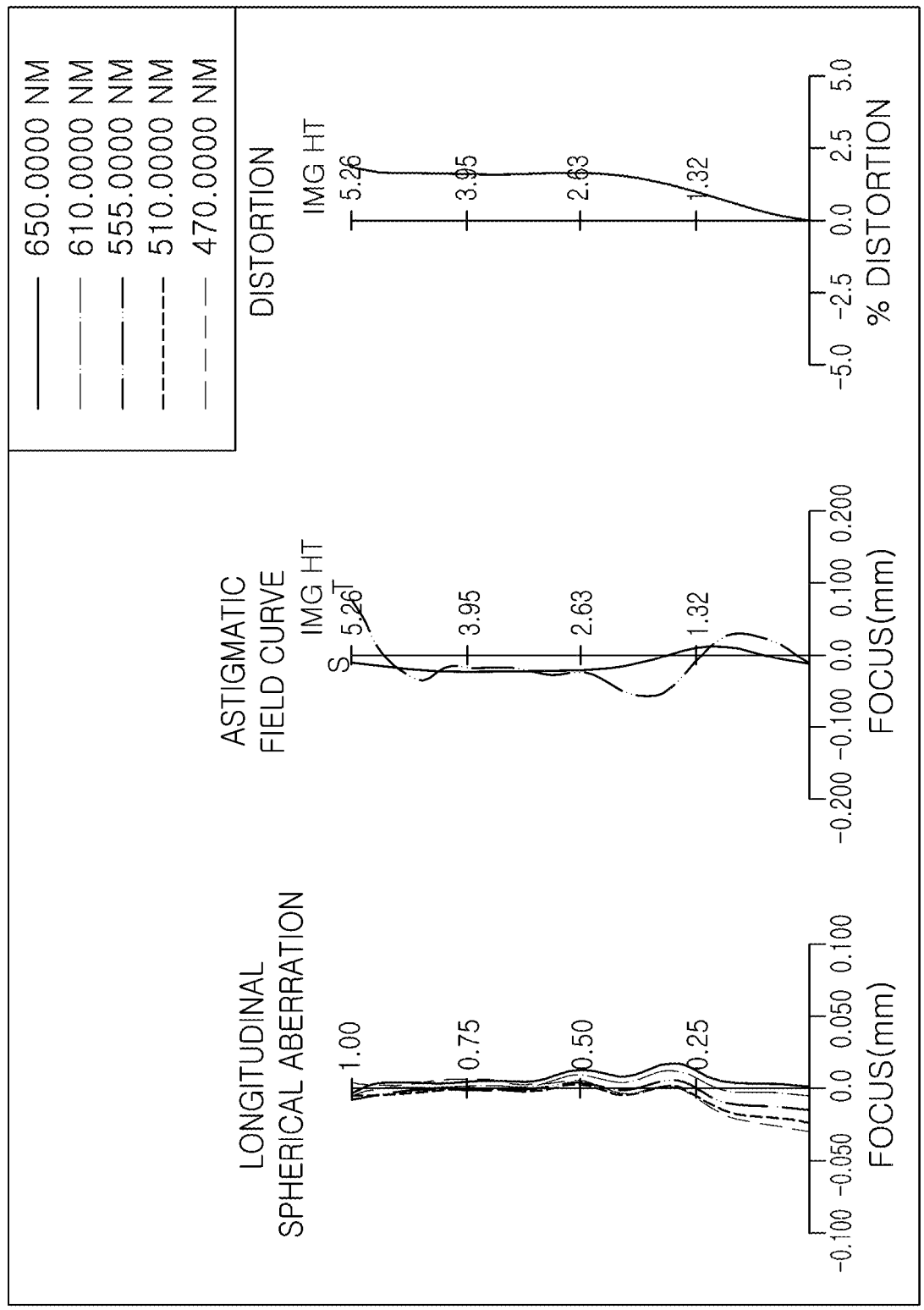
FIG. 10 is a diagram illustrating aberration characteristics of the optical imaging system illustrated in FIG. 9.

An optical imaging system according to a fifth example will be described with reference to FIGS. 9 and 10.

An optical imaging system according to the fifth example includes a first lens 510, a second lens 520, a third lens 530, a fourth lens 540, a fifth lens 550, a sixth lens 560, a seventh lens 570 and an eighth lens 580, and may further include an aperture, a filter 590, and an image sensor 591.

Table 9 illustrates the characteristics of each lens (radius of curvature, thickness of the lens, distance between lenses, index of refraction, Abbe number, and focal length).

TABLE 9

| Surface Number | Remark | Radius of Curvature | Thickness or Distance | Refractive Index | Abbe Number | Focal Length |
|---|---|---|---|---|---|---|
| S1 | First Lens | 2.74 | 0.931 | 1.546 | 56.0 | 6.2031 |
| S2 |  | 12.57 | 0.076 |  |  |  |
| S3 | Second Lens | 12.25 | 0.287 | 1.546 | 56.0 | 111.0399 |
| S4 |  | 15.23 | 0.083 |  |  |  |
| S5 | Third Lens | 9.52 | 0.253 | 1.687 | 18.2 | −14.7018 |
| S6 |  | 4.85 | 0.465 |  |  |  |
| S7 | Fourth Lens | −46.00 | 0.300 | 1.546 | 56.0 | −96.9929 |
| S8 |  | −350.00 | 0.268 |  |  |  |
| S9 | Fifth Lens | 22.51 | 0.380 | 1.667 | 20.4 | −71.9233 |
| S10 |  | 15.22 | 0.589 |  |  |  |
| S11 | Sixth Lens | 9.05 | 0.486 | 1.570 | 37.4 | 48.2216 |

TABLE 9-continued

| Surface Number | Remark | Radius of Curvature | Thickness or Distance | Refractive Index | Abbe Number | Focal Length |
|---|---|---|---|---|---|---|
| S12 | | 13.23 | 0.585 | | | |
| S13 | Seventh Lens | 3.62 | 0.810 | 1.537 | 55.7 | 8.4388 |
| S14 | | 16.60 | 0.714 | | | |
| S15 | Eighth Lens | 6.04 | 0.490 | 1.546 | 56.0 | −5.7434 |
| S16 | | 2.01 | 0.370 | | | |
| S17 | Filter | Infinity | 0.110 | 1.518 | 64.2 | |
| S18 | | Infinity | 0.883 | | | |
| S19 | Image Plane | Infinity | 0.000 | | | |

The total focal length f of the optical imaging system according to the fifth example is 6.8873 mm, Fno is 1.80, FOV is 73.7°, and IMG HT is 5.264 mm.

In the fifth example, the first lens 510 has positive refractive power, the first surface of the first lens 510 is convex, and the second surface of the first lens 510 is concave.

The second lens 520 has positive refractive power, the first surface of the second lens 520 has a convex shape, and the second surface of the second lens 520 has a concave shape.

The third lens 530 has negative refractive power, the first surface of the third lens 530 has a convex shape, and the second surface of the third lens 530 has a concave shape.

The fourth lens 540 has negative refractive power, a first surface of the fourth lens 540 has a concave shape, and a second surface of the fourth lens 540 has a convex shape.

The fifth lens 550 has negative refractive power, the first surface of the fifth lens 550 is convex in the paraxial region, and the second surface of the fifth lens 550 is concave in the paraxial region.

In addition, at least one inflection point is formed on at least one of the first and second surfaces of the fifth lens 550. For example, the first surface of the fifth lens 550 may be convex in the paraxial region and concave in a portion other than the paraxial region. The second surface of the fifth lens 550 may be concave in the paraxial region and convex in a portion other than the paraxial region.

The sixth lens 560 has positive refractive power, the first surface of the sixth lens 560 has a convex shape in the paraxial region, and the second surface of the sixth lens 560 has a concave shape in the paraxial region.

In addition, at least one inflection point is formed on at least one of the first and second surfaces of the sixth lens 560. For example, the first surface of the sixth lens 560 may be convex in a paraxial region and concave in a portion other than the paraxial region. The second surface of the sixth lens 560 may be concave in the paraxial region and convex in a portion other than the paraxial region.

The seventh lens 570 has positive refractive power, the first surface of the seventh lens 570 is convex in the paraxial region, and the second surface of the seventh lens 570 is concave in the paraxial region.

In addition, at least one inflection point is formed on at least one of the first and second surfaces of the seventh lens 570. For example, the first surface of the seventh lens 570 may be convex in the paraxial region and concave in a portion other than the paraxial region. The second surface of the seventh lens 570 may be concave in the paraxial region and convex in a portion other than the paraxial region.

The eighth lens 580 has negative refractive power, the first surface of the eighth lens 580 is convex in the paraxial region, and the second surface of the eighth lens 580 is concave in the paraxial region.

In addition, at least one inflection point is formed on at least one of the first and second surfaces of the eighth lens 580. For example, the first surface of the eighth lens 580 may be convex in a paraxial region and concave in a portion other than the paraxial region. The second surface of the eighth lens 580 may be concave in the paraxial region and convex in a portion other than the paraxial region.

Each surface of the first to eighth lenses 510 to 580 has an aspheric coefficient as illustrated in Table 10. For example, both the object-side and image-side surfaces of the first to eighth lenses 510 to 580 are aspherical.

TABLE 10

| | S1 | S2 | S3 | S4 | S5 | S6 | S7 | S8 |
|---|---|---|---|---|---|---|---|---|
| Conic Constant(K) | −1.026E+00 | 2.381E+01 | 2.431E+01 | 2.331E+01 | 1.868E+01 | 2.281E+00 | 9.321E+00 | 9.500E+01 |
| 4th Coefficient(A) | 4.374E−03 | −4.290E−02 | −5.002E−02 | −5.856E−02 | −5.973E−02 | −1.387E−02 | 8.771E−03 | −2.323E−02 |
| 6th Coefficient(B) | 1.723E−02 | 1.897E−01 | 2.045E−01 | 2.753E−01 | 2.441E−01 | −5.508E−02 | −2.021E−01 | 4.320E−02 |
| 8th Coefficient(C) | −8.099E−02 | −6.669E−01 | −6.708E−01 | −1.022E+00 | −9.983E−01 | 5.272E−01 | 9.972E−01 | −2.626E−01 |
| 10th Coefficient(D) | 2.283E−01 | 1.522E+00 | 1.480E+00 | 2.618E+00 | 2.857E+00 | −2.363E+00 | −3.157E+00 | 9.788E−01 |
| 12th Coefficient(E) | −4.076E−01 | −2.315E+00 | −2.185E+00 | −4.579E+00 | −5.573E+00 | 6.677E+00 | 6.723E+00 | −2.385E+00 |

TABLE 10-continued

| | | | | | | | | |
|---|---|---|---|---|---|---|---|---|
| 14th Coefficient(F) | 4.880E−01 | 2.441E+00 | 2.216E+00 | 5.582E+00 | 7.587E+00 | −1.273E+01 | −9.979E+00 | 3.977E+00 |
| 16th Coefficient(G) | −4.065E−01 | −1.838E+00 | −1.582E+00 | −4.846E+00 | −7.366E+00 | 1.696E+01 | 1.056E+01 | −4.662E+00 |
| 18th Coefficient(H) | 2.404E−01 | 1.005E+00 | 8.057E−01 | 3.038E+00 | 5.167E+00 | −1.610E+01 | −8.049E+00 | 3.901E+00 |
| 20th Coefficient(J) | −1.017E−01 | −4.009E−01 | −2.934E−01 | −1.379E+00 | −2.626E+00 | 1.094E+01 | 4.426E+00 | −2.339E+00 |
| 22th Coefficient(L) | 3.058E−02 | 1.157E−01 | 7.550E−02 | 4.492E−01 | 9.574E−01 | −5.288E+00 | −1.735E+00 | 9.965E−01 |
| 24th Coefficient(M) | −6.382E−03 | −2.356E−02 | −1.330E−02 | −1.023E−01 | −2.441E−01 | 1.773E+00 | 4.719E−01 | −2.945E−01 |
| 26th Coefficient(N) | 8.795E−04 | 3.211E−03 | 1.510E−03 | 1.548E−02 | 4.129E−02 | −3.923E−01 | −8.433E−02 | 5.734E−02 |
| 28th Coefficient(O) | −7.197E−05 | −2.632E−04 | −9.748E−05 | −1.395E−03 | −4.160E−03 | 5.150E−02 | 8.874E−03 | −6.616E−03 |
| 30th Coefficient(P) | 2.648E−06 | 9.814E−06 | 2.615E−06 | 5.663E−05 | 1.888E−04 | −3.037E−03 | −4.146E−04 | 3.424E−04 |

| | S9 | S10 | S11 | S12 | S13 | S14 | S15 | S16 |
|---|---|---|---|---|---|---|---|---|
| Conic Constant(K) | 2.499E+01 | −9.865E+00 | −2.924E+01 | −8.722E+01 | −4.773E+00 | 1.212E+01 | −9.500E+01 | −7.299E+00 |
| 4th Coefficient(A) | −5.609E−02 | −3.329E−02 | −4.444E−02 | −5.991E−02 | −1.615E−03 | 2.928E−02 | −5.940E−02 | −4.474E−02 |
| 6th Coefficient(B) | 1.223E−01 | −3.407E−02 | 2.465E−02 | 4.822E−03 | −1.082E−02 | −9.839E−03 | 1.417E−02 | 1.531E−02 |
| 8th Coefficient(C) | −5.318E−01 | 1.713E−01 | −1.820E−02 | 2.513E−02 | 8.200E−03 | 1.742E−03 | 6.115E−04 | −4.626E−03 |
| 10th Coefficient(D) | 1.547E+00 | −4.214E−01 | 1.979E−02 | −3.204E−02 | −5.062E−03 | −5.906E−04 | −1.536E−03 | 1.181E−03 |
| 12th Coefficient(E) | −3.091E+00 | 6.580E−01 | −1.987E−02 | 2.321E−02 | 2.080E−03 | 2.249E−04 | 5.196E−04 | −2.535E−04 |
| 14th Coefficient(F) | 4.364E+00 | −7.044E−01 | 1.399E−02 | −1.134E−02 | −5.763E−04 | −5.357E−05 | −9.758E−05 | 4.295E−05 |
| 16th Coefficient(G) | −4.437E+00 | 5.353E−01 | −6.739E−03 | 3.904E−03 | 1.116E−04 | 7.742E−06 | 1.189E−05 | −5.446E−06 |
| 18th Coefficient(H) | 3.283E+00 | −2.934E−01 | 2.257E−03 | −9.605E−04 | −1.538E−05 | −6.537E−07 | −9.935E−07 | 5.046E−07 |
| 20th Coefficient(J) | −1.768E+00 | 1.163E−01 | −5.295E−04 | 1.687E−04 | 1.516E−06 | 2.295E−08 | 5.817E−08 | −3.380E−08 |
| 22th Coefficient(L) | 6.848E−01 | −3.304E−02 | 8.649E−05 | −2.094E−05 | −1.059E−07 | 1.223E−09 | −2.387E−09 | 1.616E−09 |
| 24th Coefficient(M) | −1.857E−01 | 6.549E−03 | −9.606E−06 | 1.788E−06 | 5.119E−09 | −1.904E−10 | 6.737E−11 | −5.382E−11 |
| 26th Coefficient(N) | 3.345E−02 | −8.602E−04 | 6.901E−07 | −9.994E−08 | −1.626E−10 | 1.004E−11 | −1.246E−12 | 1.188E−12 |
| 28th Coefficient(O) | −3.588E−03 | 6.725E−05 | −2.886E−08 | 3.287E−09 | 3.052E−12 | −2.599E−13 | 1.360E−14 | −1.563E−14 |
| 30th Coefficient(P) | 1.733E−04 | −2.369E−06 | 5.326E−10 | −4.823E−11 | −2.565E−14 | 2.757E−15 | −6.650E−17 | 9.295E−17 |

Table 11 illustrates the values of the conditional expressions of the optical imaging systems according to respective examples.

TABLE 11

| Conditional Expression | Example 1 | Example 2 | Example 3 | Example 4 | Example 5 |
|---|---|---|---|---|---|
| 0 < f1/f < 1.4 | 0.9130 | 0.9278 | 0.9320 | 0.9060 | 0.9007 |
| 25 < v1 − v3 < 45 | 37.8 | 37.8 | 36.8 | 37.8 | 37.8 |
| 25 < v1 − v5 < 45 | 32.5 | 35.6 | 35.6 | 35.6 | 35.6 |
| 15 < v1 − v6 < 25 | 18.64 | 18.64 | 18.64 | 18.64 | 18.64 |
| 5 < f2/f < 50 | 21.4684 | 15.7401 | 13.4313 | 18.8551 | 16.1224 |
| −5 < f3/f < 0 | −2.1671 | −2.1828 | −2.1439 | −2.1348 | −2.1346 |
| \|f4/f\| > 3 | 10.1180 | 12.9335 | 10.7730 | −71.7847 | −14.0829 |
| −25 < f5/f < 0 | −7.0241 | −6.5477 | −5.4166 | −9.0965 | −10.4429 |
| \|f6/f\| > 2 | −15.3981 | 15.0388 | −32.3487 | 8.2269 | 7.0015 |
| f7/f < 5 | 1.0864 | 1.2625 | 1.0556 | 1.2905 | 1.2253 |
| TTL/f < 1.2 | 1.1857 | 1.1794 | 1.1851 | 1.1782 | 1.1732 |
| \|f1/f2\| < 1 | 0.0425 | 0.0589 | 0.0694 | 0.0481 | 0.0559 |
| −2 < f2/f3 < 0 | −0.4213 | −0.4250 | −0.4347 | −0.4244 | −0.4219 |
| BFL/f < 0.3 | 0.1970 | 0.1970 | 0.2088 | 0.1938 | 0.1979 |
| D12/f < 0.1 | 0.0048 | 0.0107 | 0.0109 | 0.0110 | 0.0110 |
| D67 − D12 − D23 > 0.2 | 0.2809 | 0.3043 | 0.2769 | 0.3773 | 0.4264 |
| TTL/(2*IMG HT) < 0.8 | 0.7111 | 0.7076 | 0.7124 | 0.7639 | 0.7675 |
| D12/D_MAX < 0.15 | 0.0459 | 0.1076 | 0.1110 | 0.1051 | 0.1065 |
| (D12 + D23)/D_SUM < 0.1 | 0.0434 | 0.0492 | 0.0519 | 0.0583 | 0.0571 |
| 0.9 < R2/R3 <1.1 | 1.0024 | 1.0208 | 1.0128 | 1.0264 | 1.0264 |
| 70° < FOV < 92° | 78.5 | 78.4 | 78.4 | 74.2 | 73.7 |
| 1.5 < Fno < 2 | 1.78 | 1.78 | 1.83 | 1.78 | 1.80 |

As set forth above, in an optical imaging system according to an example, the size may be reduced while implementing relatively high resolution.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
a total of eight lenses including a first lens having positive refractive power, a second lens having positive refractive power, a third lens having negative refractive power, a fourth lens having refractive power and a concave object-side surface in a paraxial region, a fifth lens having negative refractive power, a sixth lens having refractive power, a seventh lens having refractive power, and an eighth lens having refractive power disposed sequentially from an object side,
wherein D12/D_MAX <0.15, where D12 is a distance on an optical axis between an image-side surface of the first lens and an object-side surface of the second lens, and D_MAX is a greatest distance among distances between neighboring lenses,
wherein 5<f2/f<50, where f2 is a focal length of the second lens and f is a total focal length of the optical imaging system, and
wherein TTL/(2*IMG HT)<0.8, where TTL is a distance on the optical axis from an object-side surface of the first lens to an image plane, and IMG HT is one-half of a diagonal length of the image plane.

2. The optical imaging system of claim 1, wherein (D12+D23)/D_SUM <0.1, where D23 is a distance on the optical axis between an image-side surface of the second lens and an object-side surface of the third lens, and D_SUM is a sum of the distances between each pair of the neighboring lenses.

3. An optical imaging system comprising:
a total of eight lenses including a first lens having positive refractive power, a second lens having positive refractive power, a third lens having negative refractive power, a fourth lens having refractive power and a concave object-side surface in a paraxial region, a fifth lens having negative refractive power, a sixth lens having refractive power, a seventh lens having refractive power, and an eighth lens having refractive power disposed sequentially from an object side,
wherein D12/D_MAX <0.15, where D12 is a distance on an optical axis between an image-side surface of the first lens and an object-side surface of the second lens, and D_MAX is a greatest distance among distances between neighboring lenses,
wherein 5<f2/f<50, where f2 is a focal length of the second lens and f is a total focal length of the optical imaging system, and
wherein 0.9<R2/R3<1.1, where R2 is a radius of curvature of the image-side surface of the first lens, and R3 is a radius of curvature of the object-side surface of the second lens.

4. The optical imaging system of claim 3, wherein the first lens has a meniscus shape convex toward the object side, and the second lens has a meniscus shape convex toward the object side.

5. The optical imaging system of claim 1, wherein D12/f<0.1.

6. An optical imaging system comprising:
a total of eight lenses including a first lens having positive refractive power, a second lens having positive refractive power, a third lens having negative refractive power, a fourth lens having refractive power and a concave object-side surface in a paraxial region, a fifth lens having negative refractive power, a sixth lens having refractive power, a seventh lens having refractive power, and an eighth lens having refractive power disposed sequentially from an object side, wherein D12/D_MAX <0.15, where D12 is a distance on an optical axis between an image-side surface of the first lens and an object-side surface of the second lens, and D_MAX is a greatest distance among distances between neighboring lenses, wherein 5<f2/f<50, where f2 is a focal length of the second lens and f is a total focal length of the optical imaging system, and wherein D67-D12-D23 >0.2 mm, where D23 is a distance on the optical axis between an image-side surface of the second lens and an object-side surface of the third lens, and D67 is a distance on the optical axis between an image-side surface of the sixth lens and an object-side surface of the seventh lens.

7. The optical imaging system of claim 1, wherein TTL/f<1.2 and BFL/f<0.3, where BFL is a distance on the optical axis from an image-side surface of the eighth lens to the image plane.

8. The optical imaging system of claim 1, wherein at least one of 25<v1-v3<45, 25<v1-v5<45 and 15<v1-v6<25 is satisfied, where v1 is an Abbe number of the first lens, v3 is an Abbe number of the third lens, v5 is an Abbe number of the fifth lens, and v6 is an Abbe number of the sixth lens.

9. The optical imaging system of claim 8, wherein the fifth lens has a negative refractive power, and the sixth lens has a positive or negative refractive power, and the third lens, the fifth lens, and the sixth lens each have a refractive index of 1.57 or more.

10. The optical imaging system of claim 9, wherein the third lens and the fifth lens each have a refractive index greater than 1.64.

11. The optical imaging system of claim 1, wherein |f1/f2|<1, where f1 is a focal length of the first lens.

12. The optical imaging system of claim 11, wherein 0<f1/f<1.4.

* * * * *